(12) United States Patent
DeJonge

(10) Patent No.: US 11,388,791 B2
(45) Date of Patent: *Jul. 12, 2022

(54) LOAD CONTROL DEVICE FOR A LIGHT-EMITTING DIODE LIGHT SOURCE

(71) Applicant: Lutron Technology Company LLC, Coopersburg, PA (US)

(72) Inventor: Stuart W. DeJonge, Riegelsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,953

(22) Filed: Oct. 27, 2020

(65) Prior Publication Data

US 2021/0045206 A1    Feb. 11, 2021

Related U.S. Application Data

(63) Continuation of application No. 16/595,970, filed on Oct. 8, 2019, now Pat. No. 10,827,577, which is a
(Continued)

(51) Int. Cl.
| | |
|---|---|
| *H05B 45/14* | (2020.01) |
| *H02M 3/335* | (2006.01) |
| *H02M 1/42* | (2007.01) |
| *H05B 45/327* | (2020.01) |
| *H05B 45/382* | (2020.01) |
| *H05B 45/39* | (2020.01) |
| *H05B 45/10* | (2020.01) |

(52) U.S. Cl.
CPC .......... *H05B 45/14* (2020.01); *H02M 1/4225* (2013.01); *H02M 3/33507* (2013.01); *H05B 45/327* (2020.01); *H05B 45/382* (2020.01); *H05B 45/39* (2020.01); *H05B 45/10* (2020.01)

(58) Field of Classification Search
CPC ............ H05B 33/0848; H05B 33/0815; H05B 33/0818; H05B 33/0851; H02M 3/33507; H02M 1/4225
(Continued)

(56) References Cited

U.S. PATENT DOCUMENTS 5,568,044 A    10/1996   Bittner
6,580,309 B2    6/2003   Jacobs et al.
(Continued)

FOREIGN PATENT DOCUMENTS

CN    1758175 A    4/2006
CN    102612227 A    7/2012
(Continued)

OTHER PUBLICATIONS

CN 1758175 A, Cited in First Office Action dated Dec. 3, 2018, issued in related Chinese Patent Application No. 201680032161.6.
(Continued)

*Primary Examiner* — Don P Le
(74) *Attorney, Agent, or Firm* — Michael Czarnecki; Philip Smith; Glen Farbanish

(57) ABSTRACT

A load control device for controlling the amount of power delivered to an electrical load is able to operate in a normal mode and a burst mode. The load control device may comprise a control circuit that activates an inverter circuit during active state periods and deactivates the inverter circuit during inactive state periods. The control circuit may operate in the normal mode to regulate an average magnitude of a load current conducted through the electrical load to be above a minimum rated current. The control circuit may operate in the burst mode to adjust the average magnitude of the load current to be below the minimum rated current. The control circuit may adjust the average magnitude of the load current by adjusting the length of the inactive state periods while holding the length of the active state periods constant.

22 Claims, 13 Drawing Sheets

Related U.S. Application Data continuation of application No. 16/219,428, filed on Dec. 13, 2018, now Pat. No. 10,455,659, which is a continuation of application No. 15/857,271, filed on Dec. 28, 2017, now Pat. No. 10,194,501, which is a continuation of application No. 15/399,694, filed on Jan. 5, 2017, now Pat. No. 9,888,540, which is a continuation of application No. 15/142,876, filed on Apr. 29, 2016, now Pat. No. 9,565,731.

(60) Provisional application No. 62/155,871, filed on May 1, 2015.

(58) Field of Classification Search
USPC .......................................................... 315/307
See application file for complete search history.

(56) References Cited

U.S. PATENT DOCUMENTS

| | | | |
|---|---|---|---|
| 6,707,264 B2 | 3/2004 | Lin et al. | |
| 6,788,006 B2 | 9/2004 | Yamamoto et al. | |
| 6,841,947 B2 | 1/2005 | Berg-Johansen et al. | |
| 7,061,191 B2 | 6/2006 | Chitta | |
| 7,071,762 B2 | 7/2006 | Xu et al. | |
| 7,102,339 B1 | 9/2006 | Ferguson | |
| 7,102,340 B1 | 9/2006 | Ferguson et al. | |
| 7,211,966 B2 | 5/2007 | Green et al. | |
| 7,420,333 B1 | 9/2008 | Hamdad et al. | |
| 7,535,183 B2 | 5/2009 | Gurr et al. | |
| 7,642,734 B2 | 1/2010 | De et al. | |
| 7,759,881 B1 * | 7/2010 | Melanson | H05B 45/14 315/307 |
| 7,791,584 B2 | 9/2010 | Korcharz et al. | |
| 7,855,520 B2 | 12/2010 | Leng et al. | |
| 7,863,827 B2 | 1/2011 | Johnsen et al. | |
| 7,923,939 B1 | 4/2011 | Hamdad et al. | |
| 8,044,608 B2 | 10/2011 | Kuo et al. | |
| 8,076,867 B2 | 12/2011 | Kuo et al. | |
| 8,154,223 B2 | 4/2012 | Hsu et al. | |
| 8,198,832 B2 | 6/2012 | Bai et al. | |
| 8,217,591 B2 | 7/2012 | Chobot et al. | |
| 8,258,710 B2 | 9/2012 | Alexandrovich et al. | |
| 8,258,714 B2 | 9/2012 | Liu et al. | |
| 8,283,875 B2 | 10/2012 | Grotkowski et al. | |
| 8,288,967 B2 | 10/2012 | Liu et al. | |
| 8,288,969 B2 | 10/2012 | Hsu et al. | |
| 8,299,987 B2 | 10/2012 | Neudorf et al. | |
| 8,310,845 B2 | 11/2012 | Gaknoki et al. | |
| 8,319,448 B2 | 11/2012 | Cecconello et al. | |
| 8,339,053 B2 | 12/2012 | Yamasaki et al. | |
| 8,339,063 B2 | 12/2012 | Lin et al. | |
| 8,339,066 B2 | 12/2012 | Thornton et al. | |
| 8,339,067 B2 | 12/2012 | Lin et al. | |
| 8,354,804 B2 | 1/2013 | Otake et al. | |
| 8,368,322 B2 | 2/2013 | Yu et al. | |
| 8,378,589 B2 | 2/2013 | Kuo et al. | |
| 8,400,079 B2 | 3/2013 | Kanamori et al. | |
| 8,427,081 B2 | 4/2013 | Hsu et al. | |
| RE44,228 E | 5/2013 | Park et al. | |
| 8,466,628 B2 | 6/2013 | Shearer et al. | |
| 8,482,219 B2 | 7/2013 | Kuo et al. | |
| 8,487,540 B2 | 7/2013 | Dijkstra et al. | |
| 8,487,546 B2 | 7/2013 | Melanson | |
| 8,492,982 B2 | 7/2013 | Hagino et al. | |
| 8,492,987 B2 | 7/2013 | Nuhfer et al. | |
| 8,492,988 B2 | 7/2013 | Nuhfer et al. | |
| 8,508,150 B2 | 8/2013 | Kuo et al. | |
| 8,541,952 B2 | 9/2013 | Darshan et al. | |
| 8,558,474 B1 | 10/2013 | Park et al. | |
| 8,558,518 B2 | 10/2013 | Irissou et al. | |
| 8,581,511 B2 | 11/2013 | Kim et al. | |
| 8,587,968 B2 | 11/2013 | Zhu et al. | |
| 8,593,069 B2 | 11/2013 | Kang et al. | |
| 8,598,804 B2 | 12/2013 | Foxall et al. | |
| 8,624,526 B2 | 1/2014 | Huang et al. | |
| 8,664,888 B2 | 3/2014 | Nuhfer et al. | |
| 8,810,159 B2 | 8/2014 | Nuhfer et al. | |
| 9,245,734 B2 | 1/2016 | Goscha et al. | |
| 9,247,608 B2 | 1/2016 | Chitta et al. | |
| 9,538,618 B2 * | 1/2017 | Taipale | H05B 45/375 |
| 2004/0095114 A1 | 5/2004 | Kernahan et al. | |
| 2006/0001381 A1 * | 1/2006 | Robinson | H05B 31/50 315/185 R |
| 2006/0082538 A1 | 4/2006 | Oyama et al. | |
| 2006/0273772 A1 | 12/2006 | Groom et al. | |
| 2007/0103086 A1 | 5/2007 | Neudorf et al. | |
| 2008/0043504 A1 | 2/2008 | Ye et al. | |
| 2008/0175029 A1 | 7/2008 | Jung et al. | |
| 2009/0160360 A1 | 6/2009 | Lim et al. | |
| 2009/0160422 A1 | 6/2009 | Isobe et al. | |
| 2009/0243582 A1 * | 10/2009 | Irissou | H05B 39/08 323/320 |
| 2010/0194462 A1 | 8/2010 | Petruzzi et al. | |
| 2013/0043806 A1 * | 2/2013 | Caldani | H05B 39/045 315/276 |
| 2013/0063047 A1 | 3/2013 | Veskovic | |
| 2013/0063100 A1 | 3/2013 | Henzler | |
| 2013/0141001 A1 | 6/2013 | Datta et al. | |
| 2013/0154503 A1 | 6/2013 | Decius et al. | |
| 2013/0229829 A1 | 9/2013 | Zhang et al. | |
| 2013/0234612 A1 | 9/2013 | Zeng et al. | |
| 2013/0250627 A1 * | 9/2013 | Herfurth | H02M 3/3376 363/21.15 |
| 2013/0300309 A1 * | 11/2013 | Melanson | H05B 45/14 315/224 |
| 2014/0009084 A1 | 1/2014 | Veskovic et al. | |
| 2014/0009085 A1 | 1/2014 | Veskovic et al. | |
| 2014/0062330 A1 * | 3/2014 | Neundorfer | H05B 39/044 315/224 |
| 2014/0103894 A1 | 4/2014 | McJimsey et al. | |
| 2014/0176016 A1 * | 6/2014 | Li | H05B 45/3575 315/307 |
| 2014/0265887 A1 * | 9/2014 | Kamal | H05B 45/50 315/186 |
| 2014/0265935 A1 | 9/2014 | Sadwick et al. | |
| 2014/0312796 A1 | 10/2014 | Sauerländer et al. | |
| 2014/0368109 A1 * | 12/2014 | Goscha | H05B 41/3927 315/34 |
| 2015/0115830 A1 * | 4/2015 | Siessegger | H04B 3/548 315/291 |
| 2015/0230298 A1 * | 8/2015 | Chu | H05B 45/48 315/186 |
| 2015/0257214 A1 * | 9/2015 | Hsu | H05B 45/24 315/201 |
| 2016/0029447 A1 * | 1/2016 | Ido | H05B 45/48 315/201 |
| 2016/0134187 A1 * | 5/2016 | Pregitzer | H02M 3/156 323/285 |
| 2016/0365799 A1 * | 12/2016 | Nakano | H02M 3/33507 |
| 2017/0011676 A1 * | 1/2017 | Wu | G09G 3/2014 |
| 2017/0104411 A1 * | 4/2017 | Tomasovics | H02M 3/157 |
| 2017/0118812 A1 * | 4/2017 | DeJonge | H05B 45/39 |
| 2017/0126949 A1 * | 5/2017 | Dorai | H05B 45/10 |
| 2017/0127486 A1 * | 5/2017 | Kang | H05B 45/50 |

FOREIGN PATENT DOCUMENTS

| | | |
|---|---|---|
| EP | 2515611 A1 | 10/2012 |
| EP | 2579684 A1 | 4/2013 |
| EP | 2383873 B1 | 6/2013 |
| WO | 2008011041 A2 | 1/2008 |

OTHER PUBLICATIONS

Wikipedia, , "Forward Converter", Available at <http://en.wikipedia.org/wiki/Forward_converter>, pp. 1-2, Apr. 6, 2020.

* cited by examiner

LOAD CONTROL DEVICE FOR A LIGHT-EMITTING DIODE LIGHT SOURCE

CROSS REFERENCE TO RELATED APPLICATION

This application is a continuation of U.S. patent application Ser. No. 16/595,970, filed Oct. 8, 2019 (now U.S. Pat. No. 10,827,577), which is a continuation of U.S. patent application Ser. No. 16/219,428, filed Dec. 13, 2018 (now U.S. Pat. No. 10,455,659), which is a continuation of U.S. patent application Ser. No. 15/857,271, filed Dec. 28, 2017 (now U.S. Pat. No. 10,194,501), which is a continuation of U.S. patent application Ser. No. 15/399,694, filed Jan. 5, 2017 (now U.S. Pat. No. 9,888,540), which is a continuation of U.S. patent application Ser. No. 15/142,876, filed Apr. 29, 2016 (now U.S. Pat. No. 9,565,731), which claims the benefit of Provisional U.S. Patent Application No. 62/155,871, filed May 1, 2015, the disclosures of which are incorporated herein by reference in their entireties.

BACKGROUND

Light-emitting diode (LED) light sources (e.g., LED light engines) are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. An LED driver control device (e.g., an LED driver) may be coupled between an alternating-current (AC) power source and an LED light source for regulating the power supplied to the LED light source. The LED driver may regulate either the voltage provided to the LED light source to a particular value, the current supplied to the LED light source to a specific current value, or may regulate both the current and voltage.

LED light sources are typically rated to be driven via one of two different control techniques: a current load control technique or a voltage load control technique. An LED light source that is rated for the current load control technique is also characterized by a rated current (e.g., approximately 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., approximately 15 volts) to which the voltage across the LED light source should be regulated to ensure proper operation of the LED light source. If an LED light source rated for the voltage load control technique includes multiple parallel strings of LEDs, a current balance regulation element may be used to ensure that each of the parallel strings has the same impedance so that the same current is drawn in each parallel string.

The light output of an LED light source can be dimmed. Methods of dimming LEDs include a pulse-width modulation (PWM) technique and a constant current reduction (CCR) technique, for example. Pulse-width modulation dimming can be used for LED light sources that are controlled in either a current load control mode/technique or a voltage load control mode/technique. In pulse-width modulation dimming, a pulsed signal with a varying duty cycle is supplied to the LED light source. If the LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically used when an LED light source is being controlled using the current load control technique. In constant current reduction dimming, current is continuously provided to the LED light source. The DC magnitude of the current provided to the LED light source, however, is varied to thus adjust the intensity of the light output. Examples of LED drivers are described in greater detail in commonly-assigned U.S. Pat. No. 8,492,987, issued Jul. 23, 2010, and U.S. Patent Application Publication No. 2013/0063047, published Mar. 14, 2013, both entitled LOAD CONTROL DEVICE FOR A LIGHT-EMITTING DIODE LIGHT SOURCE, the entire disclosures of which are hereby incorporated by reference.

Dimming an LED light source using traditional techniques may result in changes in light intensity that are perceptible to the human vision. This problem may be more apparent if the dimming occurs while the LED light source is near the low end of its intensity range (e.g., below 5% of a maximum intensity). Accordingly, methods and apparatus for fine tuning the intensity of an LED light source may be desirable.

SUMMARY

As described herein, a load control device for controlling a load current conducted through an electrical load may comprise a load regulation circuit and a control circuit. The load regulation circuit may be configured to control the magnitude of a load current conducted through the electrical load in order to control the amount of power delivered to the electrical load. The load regulation circuit may comprise a switching device. The switching device may be controlled by the control circuit to operate in an active state during active state periods and in an inactive state during inactive state periods. The control circuit may be configured to operate in a normal mode and a burst mode, and to control the average magnitude of the load current towards a target load current. The normal mode may be applied when the target load current is between a maximum rated current and a minimum rated current. The burst mode may be applied when the target load current is below the minimum rated current. Further, the burst mode may be characterized by a plurality of burst mode periods each comprising one of the active state periods and one of the inactive state periods.

During the normal mode, the control circuit may be configured to regulate the average magnitude of the load current by driving the switching device between different operating states to regulate the average magnitude of the load current. The different operating states may comprise a conductive state and a non-conductive state, for example. During the burst mode, the control circuit may be configured to adjust the average magnitude of the load current by driving the switching device between the different operating states during the active state periods and stopping driving the switching device between the different operating states during the inactive state periods. The control circuit may be configured to adjust the average magnitude of the load current by adjusting the lengths of the inactive state periods and/or the active state periods. The control circuit may be configured to adjust the length of the inactive state periods in one or more of the burst mode periods while holding the length of the active state periods constant (e.g., until a maximum amount of adjustment has been made to the length of inactive state periods). The one or more burst mode periods may be adjacent to each other or may be separated by another burst mode period (or a plurality of burst mode periods). The control circuit may be configured to adjust the length of the active state periods and the length of the inactive state periods in a succeeding burst mode period. The control circuit may repeat the foregoing adjustment steps if further adjustment is desired. The amounts of adjustment made to the lengths of the inactive state periods and the active state periods may be determined such that fine tuning of the load current may be achieved. The determination may be made in real time or based on data stored in memory.

Also described herein are methods for controlling a load current conducted through an electrical load. The control may be applied in different operating modes including a normal mode and a burst mode. During the normal mode, an average magnitude of the load current may be regulated towards a target current by driving a switching device between different operating states. For example, the switching device may be driven between a conductive state and a non-conductive state to regulate the average magnitude of the load current towards the target current. During the burst mode, the average magnitude of the load current may be adjusted to the target current over a plurality of burst mode periods. Each of the burst mode periods may include an active state period and an inactive state period. The switching device may be driven between the different operating states during the active state period of each of the plurality of burst mode periods. The switching device may not be driven between the different operating states during the inactive state period of each of the plurality of burst mode periods. The length of the inactive state period may be adjusted in at least a subset of the plurality of burst mode periods while the length of the active state period may be held constant. The length of the active state period may also be adjusted, for example, by an active state adjustment amount in at least one of the plurality of burst mode periods. The length of the inactive state period may be adjusted until a total amount of adjustment is equal to approximately a threshold amount before the length of the active state period is adjusted.

DETAILED DESCRIPTION

Figure 1:
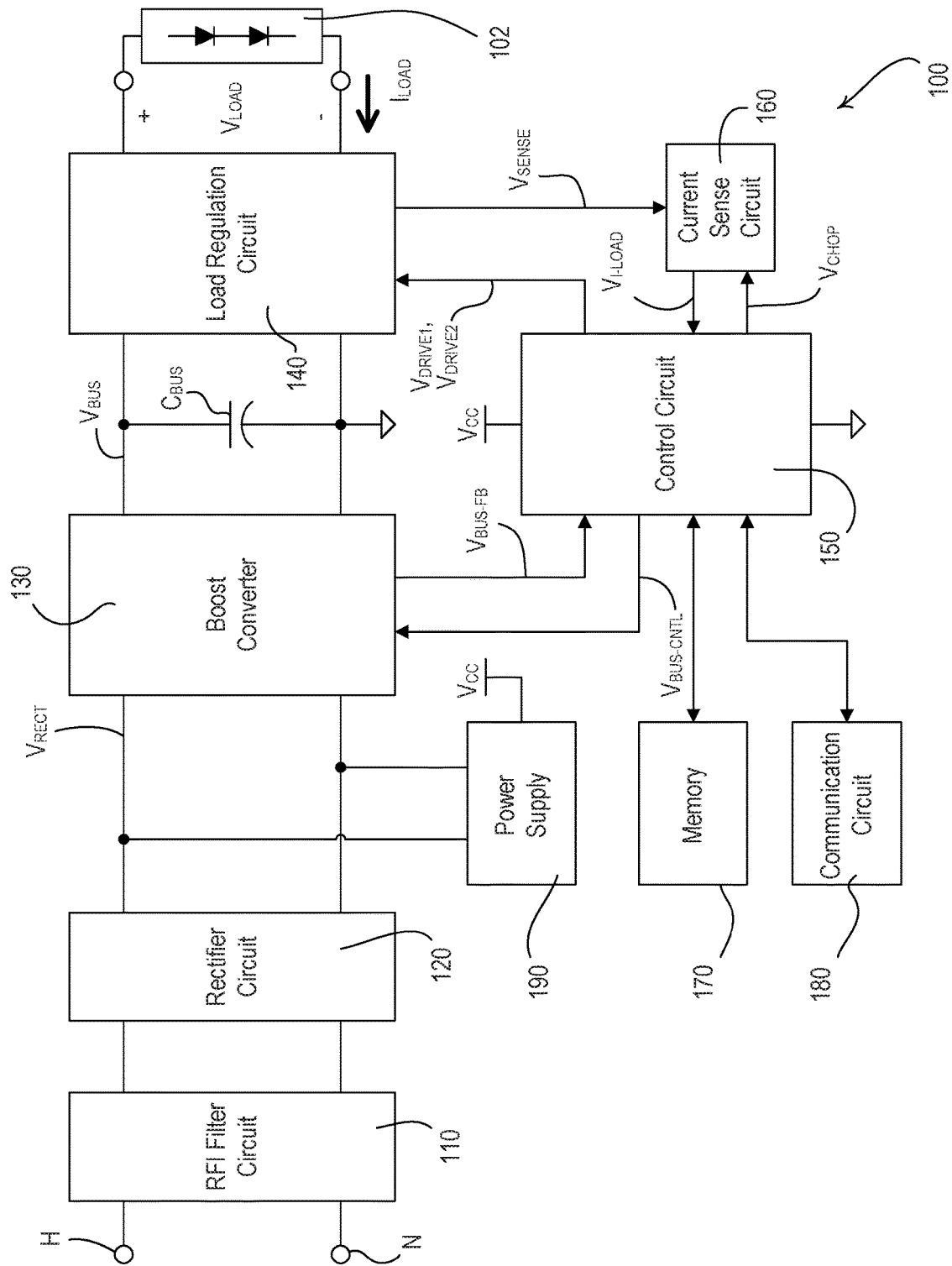
FIG. 1 is a simplified block diagram of a light-emitting diode (LED) driver for controlling the intensity of an LED light source.

FIG. 1 is a simplified block diagram of a load control device, e.g., a light-emitting diode (LED) driver 100, for controlling the amount of power delivered to an electrical load, such as, an LED light source 102 (e.g., an LED light engine), and thus the intensity of the electrical load. The LED light source 102 is shown as a plurality of LEDs connected in series but may comprise a single LED or a plurality of LEDs connected in parallel or a suitable combination thereof, depending on the particular lighting system. The LED light source 102 may comprise one or more organic light-emitting diodes (OLEDs). The LED driver 100 may comprise a hot terminal H and a neutral N. The terminals may be adapted to be coupled to an alternating-current (AC) power source (not shown).

The LED driver 100 may comprise a radio-frequency interference (RFI) filter circuit 110, a rectifier circuit 120, a boost converter 130, a load regulation circuit 140, a control circuit 150, a current sense circuit 160, a memory 170, a communication circuit 180, and/or a power supply 190. The RFI filter circuit 110 may minimize the noise provided on the AC mains. The rectifier circuit 120 may generate a rectified voltage VRECT.

The boost converter 130 may receive the rectified voltage VRECT and generate a boosted direct-current (DC) bus voltage $V_{BUS}$ across a bus capacitor $C_{BUS}$. The boost converter 130 may comprise any suitable power converter circuit for generating an appropriate bus voltage, such as, for example, a flyback converter, a single-ended primary-inductor converter (SEPIC), a Ćuk converter, or other suitable power converter circuit. The boost converter 130 may operate as a power factor correction (PFC) circuit to adjust the power factor of the LED driver 100 towards a power factor of one.

The load regulation circuit 140 may receive the bus voltage $V_{BUS}$ and control the amount of power delivered to the LED light source 102, for example, to control the intensity of the LED light source 102 between a high-end (e.g., maximum) intensity $L_{HE}$ (e.g., approximately 100%) and a low-end (e.g., minimum) intensity $L_{LE}$ (e.g., approximately 1-5% of the high-end intensity). An example of the load regulation circuit 140 may be an isolated, half-bridge forward converter. An example of the load control device (e.g., LED driver 100) comprising a forward converter is described in greater detail in commonly-assigned U.S. patent application Ser. No. 13/935,799, filed Jul. 5, 2013, entitled LOAD CONTROL DEVICE FOR A LIGHT-EMITTING DIODE LIGHT SOURCE, the entire disclosure of which is hereby incorporated by reference. The load regulation circuit 140 may comprise, for example, a buck converter, a linear regulator, or any suitable LED drive circuit for adjusting the intensity of the LED light source 102.

The control circuit 150 may be configured to control the operation of the boost converter 130 and/or the load regulation circuit 140. An example of the control circuit 150 may be a controller. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 150 may generate a bus voltage control signal $V_{BUS-CNTL}$, which may be provided to the boost converter 130 for adjusting the magnitude of the bus voltage $V_{BUS}$. The control circuit 150 may receive a bus voltage feedback control signal $V_{BUS-FB}$ from the boost converter 130, which may indicate the magnitude of the bus voltage $V_{BUS}$.

The control circuit 150 may generate drive control signals $V_{DRIVE1}$, $V_{DRIVE2}$. The drive control signals $V_{DRIVE1}$, $V_{DRIVE2}$ may be provided to the load regulation circuit 140 for adjusting the magnitude of a load voltage $V_{LOAD}$ generated across the LED light source 102 and/or the magnitude of a load current $I_{LOAD}$ conducted through the LED light source 120. By controlling the load voltage $V_{LOAD}$ and/or the load current $I_{LOAD}$, the control circuit may control the intensity of the LED light source 120 to a target intensity $L_{TRGT}$. The control circuit 150 may adjust an operating frequency $f_{OP}$ and/or a duty cycle $DC_{INV}$ (e.g., an on time $T_{ON}$) of the drive control signals $V_{DRIVE1}$, $V_{DRIVE2}$ in order to adjust the magnitude of the load voltage $V_{LOAD}$ and/or the load current $I_{LOAD}$.

The current sense circuit 160 may receive a sense voltage $V_{SENSE}$. The sense voltage $V_{SENSE}$ may be generated by the load regulation circuit 140. The sense voltage $V_{SENSE}$ may indicate the magnitude of the load current $I_{LOAD}$. The current sense circuit 160 may receive a signal-chopper control signal $V_{CHOP}$ from the control circuit 150. The current sense circuit 160 may generate a load current feedback signal $V_{I-LOAD}$, which may be a DC voltage indicating the average magnitude $I_{AVE}$ of the load current $I_{LOAD}$. The control circuit 150 may receive the load current feedback signal $V_{I-LOAD}$ from the current sense circuit 160. The control circuit 150 may adjust the drive control signals $V_{DRIVE1}$, $V_{DRIVE2}$ based on the load current feedback signal $V_{I-LOAD}$ so that the magnitude of the load current $I_{LOAD}$ may be adjusted towards a target load current $I_{TRGT}$. For example, the control circuit 150 may set initial operating parameters for the drive control signals $V_{DRIVE1}$, $V_{DRIVE2}$ (e.g., the operating frequency $f_{OP}$ and/or the duty cycle $DC_{INV}$). The control circuit 150 may receive the load current feedback signal $V_{I-LOAD}$ indicating the effect of the drive control signals $V_{DRIVE1}$, $V_{DRIVE2}$. Based on the indication, the control circuit 150 may adjust the operating parameters of the drive control signals $V_{DRIVE1}$, $V_{DRIVE2}$ to thus adjust the magnitude of the load current $I_{LOAD}$ towards a target load current $I_{TRGT}$ (e.g., using a control loop).

The load current $I_{LOAD}$ may be the current that is conducted through the LED light source 120. The target load current $I_{TRGT}$ may be the current that the control circuit 150 aims to conduct through the LED light source 120 (e.g., based at least on the load current feedback signal $V_{I-LOAD}$). The load current $I_{LOAD}$ may be approximately equal to the target load current $I_{TRGT}$ but may not always match the target load current $I_{TRGT}$. This may be because, for example, the control circuit 150 may have specific levels of granularity in which it can control the current conducted through the LED light source 120 (e.g., due to inverter cycle lengths, etc.). A person skilled in the art will appreciate that the figures shown herein (e.g., FIG. 2) that illustrate the current conducted through an LED light source as a linear graph (at least in parts) may represent the target load current $I_{TRGT}$, since the load current $I_{LOAD}$ itself may not be exactly equal to the target load current $I_{TRGT}$ and may not actually follow a true linear path.

The control circuit 150 may be coupled to the memory 170. The memory 170 may store operational characteristics of the LED driver 100 (e.g., the target intensity $L_{TRGT}$, the low-end intensity $L_{LE}$, the high-end intensity $L_{HE}$, etc.). The communication circuit 180 may be coupled to, for example, a wired communication link or a wireless communication link, such as a radio-frequency (RF) communication link or an infrared (IR) communication link. The control circuit 150 may be configured to update the target intensity $L_{TRGT}$ of the LED light source 102 and/or the operational characteristics stored in the memory 170 in response to digital messages received via the communication circuit 180. The LED driver 100 may be operable to receive a phase-control signal from a dimmer switch for determining the target intensity $L_{TRGT}$ for the LED light source 102. The power supply 190 may receive the rectified voltage $V_{RECT}$ and generate a direct-current (DC) supply voltage $V_{CC}$ for powering the circuitry of the LED driver 100.

Figure 2:
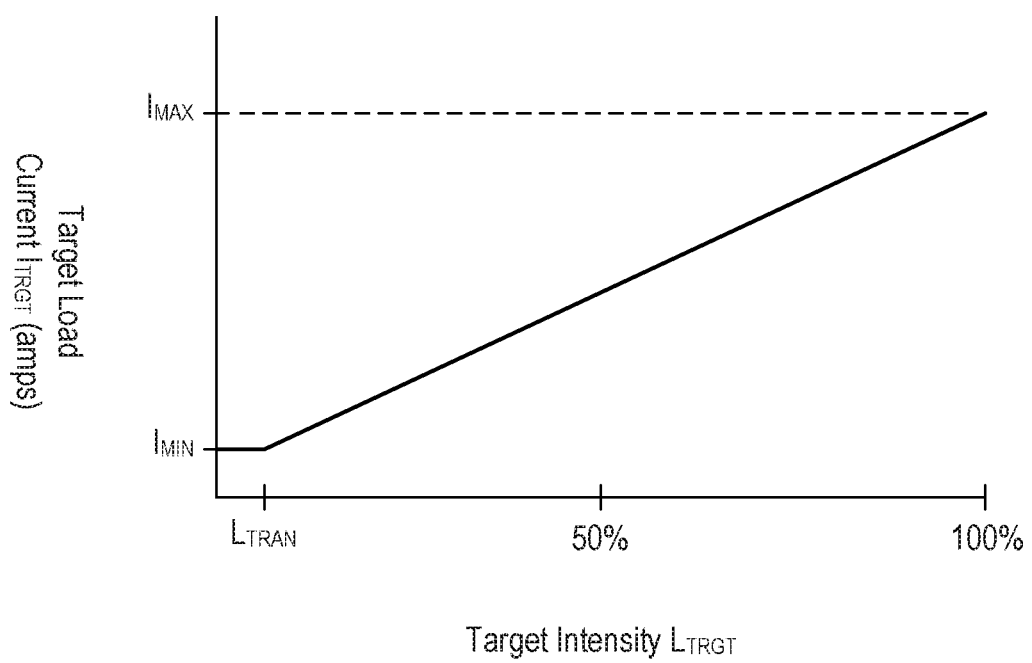
FIG. 2 is an example plot of a target load current of the LED driver of FIG. 1 as a function of a target intensity.

FIG. 2 is an example plot of the target load current $I_{TRGT}$ as a function of the target intensity $L_{TRGT}$. As shown, a linear relationship may exist between the target intensity $L_{TRGT}$ and the target load current $I_{TRGT}$. That is, to achieve a higher target intensity, the control circuit 150 may increase the target load current $I_{TRGT}$ in proportion to the increase in the target intensity; to achieve a lower target intensity, the control circuit 150 may decrease the target load current $I_{TRGT}$ in proportion to the decrease in the target intensity. As the target load current $I_{TRGT}$ is being adjusted, the magnitude of the load current $I_{LOAD}$ may change accordingly. There may be limits, however, to how much the load current $I_{LOAD}$ may be adjusted. For example, the load current $I_{LOAD}$ may not be adjusted above a maximum rated current $I_{MAX}$ or below a minimum rated current $I_{MIN}$ (e.g., due to hardware limitations of the load regulation circuit 140 and/or the control circuit 150). Thus, the control circuit may be configured to adjust the target load current $I_{TRGT}$ between the maximum rated current $I_{MAX}$ and the minimum rated current $I_{MIN}$ so that the magnitude of the load current $I_{LOAD}$ may fall into in the same range. The maximum rated current $I_{MAX}$ may correspond to the high-end intensity $L_{HE}$ (e.g., approximately 100%). The minimum rated current $I_{MIN}$ may correspond to a transition intensity $L_{TRAN}$ (e.g., approximately 5% of the maximum intensity). Between the high-end intensity $L_{HE}$ and the transition intensity $L_{TRAN}$, the control circuit 150 may operate the load regulation circuit 140 in a normal mode in which an average magnitude $I_{AVE}$ of the load current LOAD may be controlled to be equal to (e.g., approximately equal to) the target load current $I_{TRGT}$. During the normal mode, the control circuit 150 may adjust the average magnitude $I_{AVE}$ of the load current $I_{LOAD}$ to the target load current $I_{TRGT}$ in response to the load current feedback signal $V_{I-LOAD}$ (e.g., using closed loop control), for example. The control circuit 150 may apply various control techniques during the normal mode including, for example, a pulse-width modulation technique or a constant current reduction technique.

To adjust the average magnitude $I_{AVE}$ of the load current $I_{LOAD}$ to below the minimum rated current $I_{MIN}$ (and to thus adjust the target intensity $L_{TRGT}$ below the transition intensity $L_{TRAN}$), the control circuit 150 may be configured to operate the load regulation circuit 140 in a burst mode. The burst mode may be characterized by a burst operating period that includes an active state period and an inactive state period. During the active state period, the control circuit 150 may be configured to regulate the load current $I_{LOAD}$ in ways similar to those in the normal mode. During the inactive state period, the control circuit 150 may be configured to stop regulating the load current LOAD (e.g., to allow the load current $I_{LOAD}$ to drop to approximately zero). Although the active state and inactive state periods are described herein in association with the burst mode, a person skilled in the art will understand that the normal mode may also be characterized by an operating period that includes the active state period and the inactive state period, e.g., with both periods held constant and the inactive state period held at approximately zero. Examples of a load control device capable of operating in a burst mode and a normal mode are described in greater detail in commonly-assigned U.S. Pat. No. 9,247,608, issued Jan. 26, 2016, entitled LOAD CONTROL DEVICE FOR A LIGHT-EMITTING DIODE LIGHT SOURCE, the entire disclosure of which is hereby incorporated by reference.

The ratio of the active state period to the burst operating period, e.g., $T_{ACTIVE}/T_{BURST}$, may represent a burst duty cycle $DC_{BURST}$. The burst duty cycle $DC_{BURST}$ may be controlled, for example, between a maximum duty cycle $DC_{MAX}$ (e.g., approximately 100%) and a minimum duty cycle $DC_{MIN}$ (e.g., approximately 20%). The load current $I_{LOAD}$ may be adjusted towards the target current $I_{TRGT}$ (e.g., the minimum rated current $I_{MIN}$) during the active state period of the burst mode. Setting the burst duty cycle $DC_{BURST}$ to a value less than the maximum duty cycle $DC_{MAX}$ may reduce the average magnitude $I_{AVE}$ of the load current $I_{LOAD}$ to below the minimum rated current $I_{MIN}$.

Figure 3:
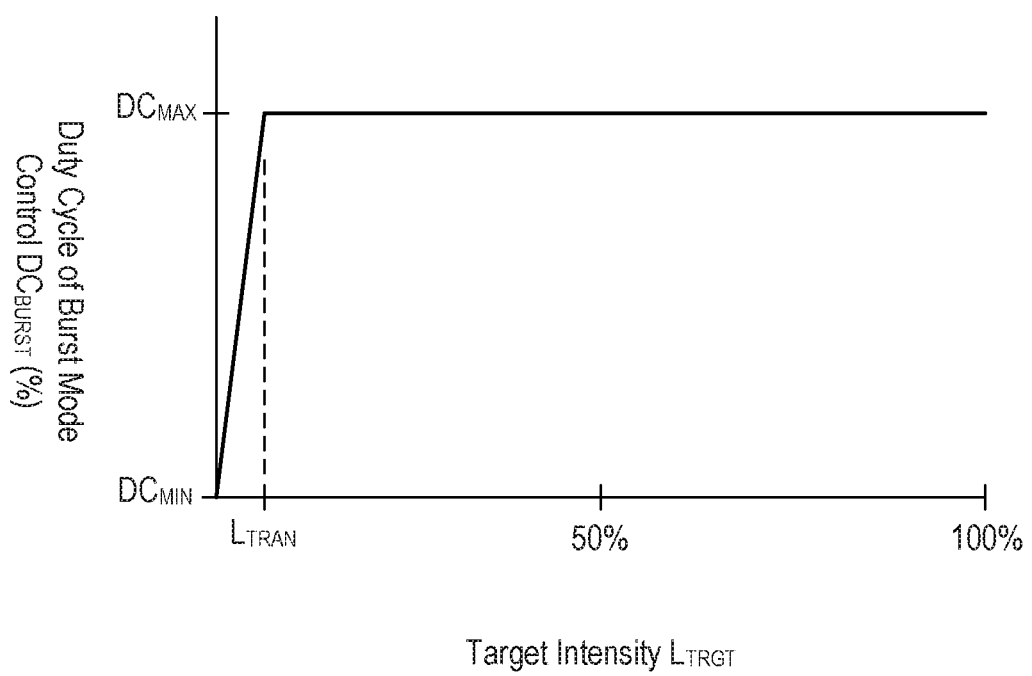
FIG. 3 is an example plot of a burst duty cycle of the LED driver of FIG. 1 as a function of the target intensity.

FIG. 3 is an example plot of a burst duty cycle $DC_{BURST}$ (e.g., an ideal burst duty cycle $DC_{BURST-IDEAL}$) as a function of the target intensity $L_{TRGT}$. As described herein, when the target intensity $L_{TRGT}$ is between the high-end intensity $L_{HE}$ (e.g., approximately 100%) and a transition intensity $L_{TRAN}$ (e.g., approximately 5% of the maximum intensity), the control circuit 150 may be configured to operate the load regulation circuit 140 in the normal mode, e.g., by setting the burst duty cycle $DC_{BURST}$ to a maximum duty cycle $DC_{MAX}$ or approximately 100%. To adjust the target intensity $L_{TRGT}$ below the transition intensity $L_{TRAN}$, the control circuit 150 may be configured to operate the load regulation circuit 140 in the burst mode, e.g., by adjusting the burst duty cycle $DC_{BURST}$ between the maximum duty cycle $DC_{MAX}$ (e.g., approximately 100%) and a minimum duty cycle $DC_{MIN}$ (e.g., approximately 20%). In the burst mode, a peak magnitude $I_{PK}$ of the load current $I_{LOAD}$ may be equal to the target current $I_{TRGT}$ (e.g., the minimum rated current $I_{MIN}$) during an active state period of the burst mode.

With reference to FIG. 3, the burst duty cycle $DC_{BURST}$ may refer to an ideal burst duty cycle $DC_{BURST-IDEAL}$, which may include an integer portion $DC_{BURST-INTEGER}$ and/or a fractional portion $DC_{BURST-FRACTIONAL}$. The integer portion $DC_{BURST-INTEGER}$ may be characterized by the percentage of the ideal burst duty cycle $DC_{BURST-IDEAL}$ that includes complete inverter cycles (i.e., an integer value of inverter cycles). The fractional portion $DC_{BURST-FRACTIONAL}$ may be characterized by the percentage of the ideal burst duty cycle $DC_{BURST-IDEAL}$ that includes a fraction of an inverter cycle. In at least some cases, the control circuit 150 (e.g., via the load regulation circuit 140) may be configured to adjust the number of inverter cycles by an integer number (e.g., by $DC_{BURST-INTEGER}$) and not a fractional amount (e.g., $DC_{BURST-FRACTIONAL}$). Therefore, although the example plot of FIG. 3 illustrates an ideal curve showing continuous adjustment of the ideal burst duty cycle $DC_{BURST-IDEAL}$ from a maximum duty cycle $DC_{MAX}$ to a minimum duty cycle $DC_{MIN}$, unless defined differently, burst duty cycle $DC_{BURST}$ may refer to the integer portion $DC_{BURST-INTEGER}$ of the ideal burst duty cycle $DC_{BURST-IDEAL}$ (e.g., if the control circuit 150 is not be configured to operate the burst duty cycle $DC_{BURST}$ at fractional amounts).

Figure 4:
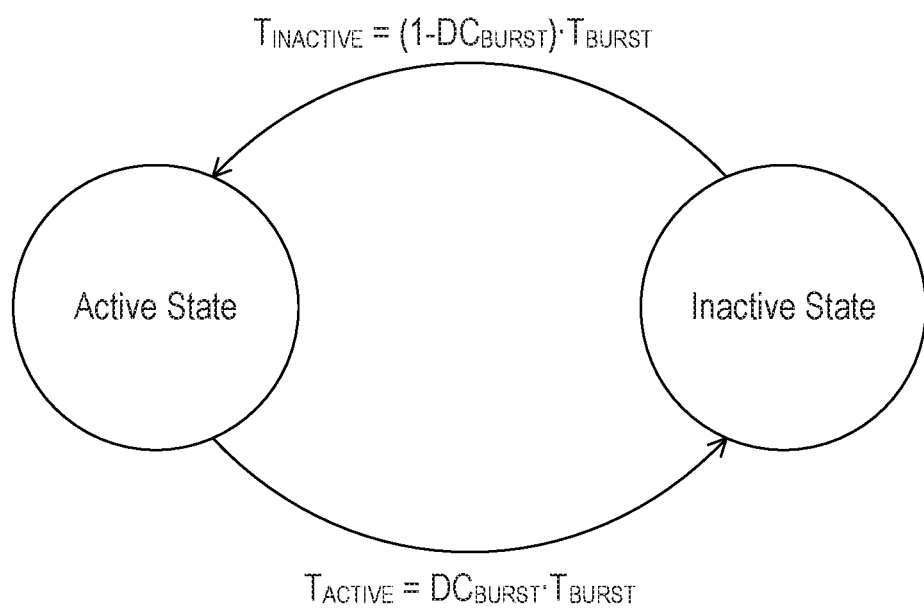
FIG. 4 is an example state diagram illustrating the operation of a load regulation circuit of the LED driver of FIG. 1 when operating in a burst mode.

FIG. 4 is an example state diagram illustrating the operation of the load regulation circuit 140 in the burst mode. During the burst mode, the control circuit 150 may periodically control the load regulation circuit 140 into an active state and an inactive state, e.g., in dependence upon a burst duty cycle $DC_{BURST}$ and a burst mode period $T_{BURST}$ (e.g., approximately 4.4 milliseconds). For example, the active state period ($T_{ACTIVE}$) may be equal to the burst duty cycle ($DC_{BURST}$) times the burst mode period ($T_{BURST}$) and the inactive state period ($T_{INACTIVE}$) may be equal to one minus the burst duty cycle ($DC_{BURST}$) times the burst mode period ($T_{BURST}$). That is, $T_{ACTIVE}=DC_{BURST} \cdot T_{BURST}$ and $T_{INACTIVE}=(1-DC_{BURST}) \cdot T_{BURST}$.

In the active state of the burst mode, the control circuit 150 may be configured to generate the drive control signals $V_{DRIVE1}$, $V_{DRIVE2}$. The control circuit 150 may be further configured to adjust the operating frequency $f_{OP}$ and/or the duty cycle $DC_{INV}$ (e.g., an on time $T_{ON}$) of the drive control signals $V_{DRIVE1}$, $V_{DRIVE2}$ in order to adjust the magnitude of the load current $I_{LOAD}$. The control circuit 150 may be configured to make the adjustments using closed loop control. For example, in the active state of the burst mode, the control circuit 150 may generate the drive signals $V_{DRIVE1}$, $V_{DRIVE2}$ to adjust the magnitude of the load current $I_{LOAD}$ to be equal to a target load current $I_{TRGT}$ (e.g., the minimum rated current $I_{MIN}$) in response to the load current feedback signal $V_{I-LOAD}$.

In the inactive state of the burst mode, the control circuit 150 may let the magnitude of the load current $I_{LOAD}$ drop to approximately zero amps, e.g., by freezing the control loop and/or not generating the drive control signals $V_{DRIVE1}$, $V_{DRIVE2}$. While the control loop is frozen (e.g., in the inactive state), the control circuit 150 may stop responding to the load current feedback signal $V_{I-LOAD}$ (e.g., the control circuit 150 may not adjust the values of the operating frequency $f_{OP}$ and/or the duty cycle $DC_{INV}$ in response to the feedback signal). The control circuit 150 may store the present duty cycle $DC_{INV}$ (e.g., the present on time $T_{ON}$) of the drive control signals $V_{DRIVE1}$, $V_{DRIVE2}$ in the memory 170 prior to (e.g., immediately prior to) freezing the control loop. When the control loop is unfrozen (e.g., when the control circuit 150 enters the active state), the control circuit 150 may resuming generating the drive control signals $V_{DRIVE1}$, $V_{DRIVE2}$ using the operating frequency $f_{OP}$ and/or the duty cycle $DC_{INV}$ from the previous active state.

The control circuit 150 may be configured to adjust the burst duty cycle $DC_{BURST}$ using an open loop control. For example, the control circuit 150 may be configured to adjust the burst duty cycle $DC_{BURST}$ as a function of the target intensity $L_{TRGT}$ when the target intensity $L_{TRGT}$ is below the transition intensity $L_{TRAN}$. For example, the control circuit 150 may be configured to linearly decrease the burst duty cycle $DC_{BURST}$ as the target intensity $L_{TRGT}$ is decreased below the transition intensity $L_{TRAN}$ (e.g., as shown in FIG. 3), while the target load current $I_{TRGT}$ is held constant at the minimum rated current $I_{MIN}$ (e.g., as shown in FIG. 2). Since the control circuit 150 changes between the active state and the inactive state in dependence upon the burst duty cycle $DC_{BURST}$ and the burst mode period $T_{BURST}$ (e.g., as shown in the state diagram of FIG. 4), the average magnitude $I_{AVE}$ of the load current $I_{LOAD}$ may be a function of the burst duty cycle $DC_{BURST}$ (e.g., $I_{AVE}=DC_{BURST} \cdot I_{MIN}$). During the burst mode, the peak magnitude $I_{PK}$ of the load current $I_{LOAD}$ may be equal to the minimum rated current $I_{MIN}$, but the average magnitude $I_{AVE}$ of the load current $I_{LOAD}$ may be less than the minimum rated current $I_{MIN}$.

Figure 5:
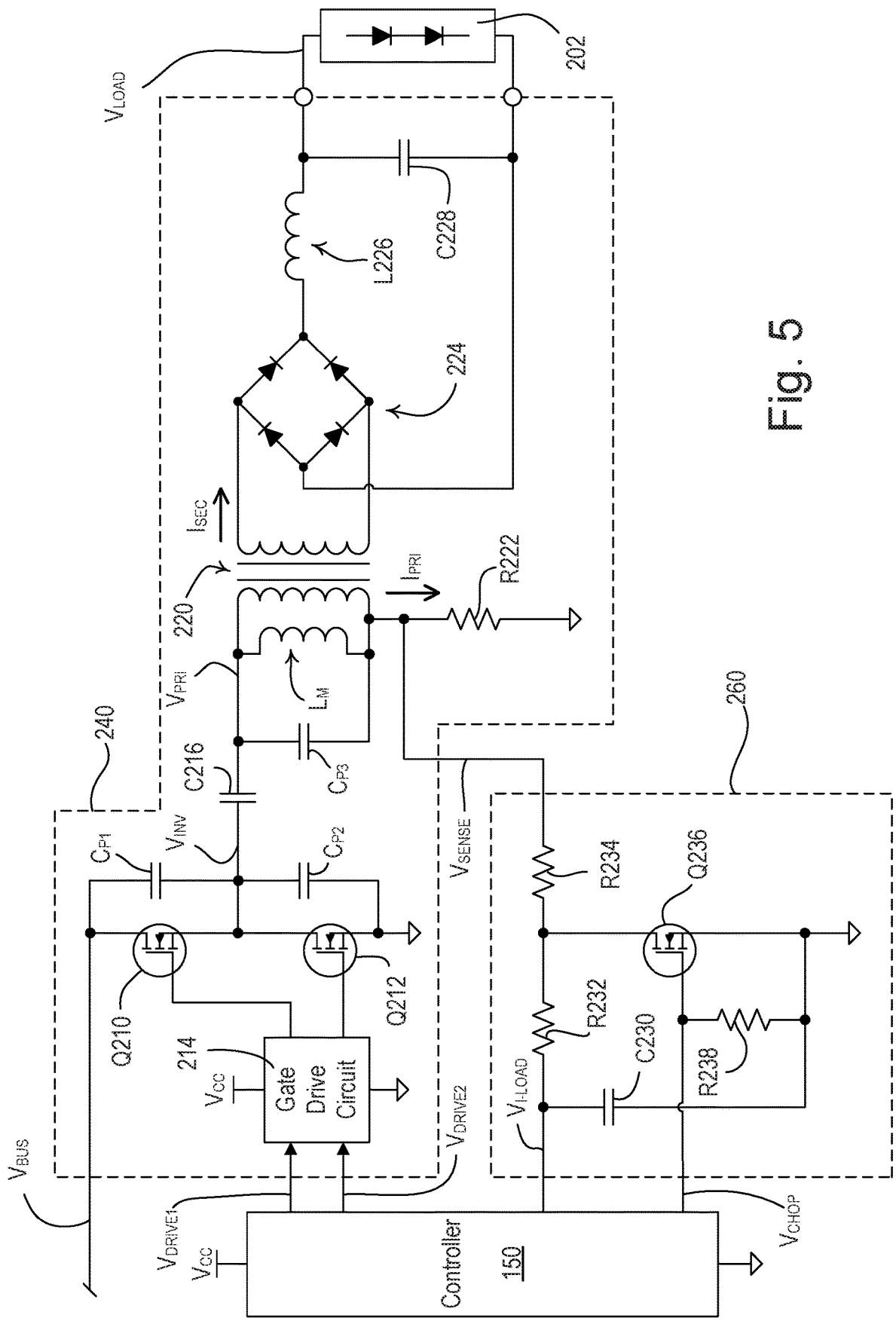
FIG. 5 is a simplified schematic diagram of an isolated forward converter and a current sense circuit of an LED driver.

FIG. 5 is a simplified schematic diagram of a forward converter 240 and a current sense circuit 260 of an LED driver (e.g., the LED driver 100 shown in FIG. 1). The forward converter 240 may be an example of the load regulation circuit 140 of the LED driver 100 shown in FIG. 1. The current sense circuit 260 may be an example of the current sense circuit 160 of the LED driver 100 shown in FIG. 1.

The forward converter 240 may comprise a half-bridge inverter circuit having two field effect transistors (FETs) Q210, Q212 for generating a high-frequency inverter voltage $V_{INV}$ from the bus voltage $V_{BUS}$. The FETs Q210, Q212 may be rendered conductive and non-conductive in response to the drive control signals $V_{DRIVE1}$, $V_{DRIVE2}$. The drive control signals $V_{DRIVE1}$, $V_{DRIVE2}$ may be received from the control circuit 150. The drive control signals $V_{DRIVE1}$, $V_{DRIVE2}$ may be coupled to the gates of the respective FETs Q210, Q212 via a gate drive circuit 214 (e.g., which may comprise part number L6382DTR, manufactured by ST Microelectronics). The control circuit 150 may be configured to generate the inverter voltage $V_{INV}$ at an operating frequency $f_{OP}$ (e.g., approximately 60-65 kHz) and thus an operating period $T_{OP}$. The control circuit 150 may be configured to adjust the operating frequency $f_{OP}$ under certain operating conditions. The control circuit 150 may be configured to adjust a duty cycle $DC_{INV}$ of the inverter voltage $V_{INV}$ to control the intensity of an LED light source 202 towards the target intensity $L_{TRGT}$.

In a normal mode of operation, when the target intensity $L_{TRGT}$ of the LED light source 202 is between the high-end intensity $L_{HE}$ and the transition intensity $L_{TRAN}$, the control circuit 150 may adjust the duty cycle $DC_{INV}$ of the inverter voltage $V_{INV}$ to adjust the magnitude (e.g., the average magnitude $I_{AVE}$) of the load current $I_{LOAD}$ towards the target load current $I_{TRGT}$. As described herein, the magnitude of the load current $I_{LOAD}$ may vary between the maximum rated current $I_{MAX}$ and the minimum rated current $I_{MIN}$ (e.g., as shown in FIG. 2). At the minimum rated current $I_{MIN}$ and/or the transition intensity $L_{TRAN}$, the inverter voltage $V_{INV}$ may be characterized by a transition (e.g., from a normal mode to a burst mode) operating frequency $f_{OP-T}$, a transition operating period $T_{OP-T}$, and a transition duty cycle $DC_{INV-T}$.

When the target intensity $L_{TRGT}$ of the LED light source 202 is below the transition intensity $L_{TRAN}$, the control circuit 150 may be configured to operate the forward converter 240 in a burst mode of operation. In addition to or in lieu of using target intensity as a threshold for determining when to operate in the burst mode, the control circuit 150 may use power (e.g., a transition power) and/or current (e.g., a transition current) as the threshold. In the burst mode of operation, the control circuit 150 may be configured to switch the forward converter 240 between an active state (e.g., in which the control circuit 150 may actively generate the drive control signals $V_{DRIVE1}$, $V_{DRIVE2}$ to regulate the peak magnitude $I_{PK}$ (of the load current $I_{LOAD}$ to be equal to the minimum rated current $I_{MIN}$) and an inactive state (e.g., in which the control circuit 150 may freeze the control loop and does not generate the drive control signals $V_{DRIVE1}$, $V_{DRIVE2}$). FIG. 4 shows a state diagram illustrating the transmission between the two states. The control circuit 150 may change the forward converter 240 between the active state and the inactive state in dependence upon a burst duty cycle $DC_{BURST}$ and a burst mode period $T_{BURST}$ (e.g., as shown in FIG. 4). The control circuit 150 may adjust the burst duty cycle $DC_{BURST}$ as a function of the target intensity $L_{TRGT}$, which is below the transition intensity $L_{TRAN}$ (e.g., as shown in FIG. 3). In the active state of the burst mode (as well as in the normal mode), the forward converter 240 may be characterized by a turn-on time $T_{TURN-ON}$ and a turn-off time $T_{TURN-OFF}$. The turn-on time $T_{TURN-ON}$ may be a time period from when the drive control signals $V_{DRIVE1}$, $V_{DRIVE2}$ are driven until the respective FET Q210, Q212 is rendered conductive. The turn-off time $T_{TURN-OFF}$ may be a time period from when the drive control signals $V_{DRIVE1}$, $V_{DRIVE2}$ are driven until the respective FET Q210, Q212 is rendered non-conductive.

The inverter voltage $V_{INV}$ may be coupled to the primary winding of a transformer 220 through a DC-blocking capacitor C216 (e.g., which may have a capacitance of approximately 0.047 µF). A primary voltage $V_{PRI}$ may be generated across the primary winding. The transformer 220 may be characterized by a turns ratio $n_{TURNS}$ (e.g., $N_1/N_2$), which may be approximately 115:29. A sense voltage $V_{SENSE}$ may be generated across a sense resistor R222, which may be coupled in series with the primary winding of the transformer 220. The FETs Q210, Q212 and the primary winding of the transformer 220 may be characterized by parasitic capacitances $C_{P1}$, $C_{P2}$, $C_{P3}$, respectively. The secondary winding of the transformer 220 may generate a secondary voltage. The secondary voltage may be coupled to the AC terminals of a full-wave diode rectifier bridge 224 for rectifying the secondary voltage generated across the secondary winding. The positive DC terminal of the rectifier bridge 224 may be coupled to the LED light source 202 through an output energy-storage inductor L226 (e.g., which may have an inductance of approximately 10 mH). The load voltage $V_{LOAD}$ may be generated across an output capacitor C228 (e.g., which may have a capacitance of approximately 3 µF).

The current sense circuit 260 may comprise an averaging circuit for producing the load current feedback signal $V_{I-LOAD}$. The averaging circuit may comprise a low-pass filter comprising a capacitor C230 (e.g., which may have a capacitance of approximately 0.066 uF) and a resistor R232 (e.g., which may have a resistance of approximately 3.32 kΩ). The low-pass filter may receive the sense voltage $V_{SENSE}$ via a resistor R234 (e.g., which may have a resistance of approximately 1 kΩ). The current sense circuit 160 may comprise a transistor Q236 (e.g., a FET as shown in FIG. 5) coupled between the junction of the resistors R232, R234 and circuit common. The gate of the transistor Q236 may be coupled to circuit common through a resistor R238 (e.g., which may have a resistance of approximately 22 kΩ). The gate of the transistor Q236 may receive the signal-chopper control signal $V_{CHOP}$ from the control circuit 150. An example of the current sense circuit 260 is described in greater detail in commonly-assigned U.S. patent application Ser. No. 13/834,153, filed Mar. 15, 2013, entitled FORWARD CONVERTER HAVING A PRIMARY-SIDE CURRENT SENSE CIRCUIT, the entire disclosure of which is hereby incorporated by reference.

Figure 6:
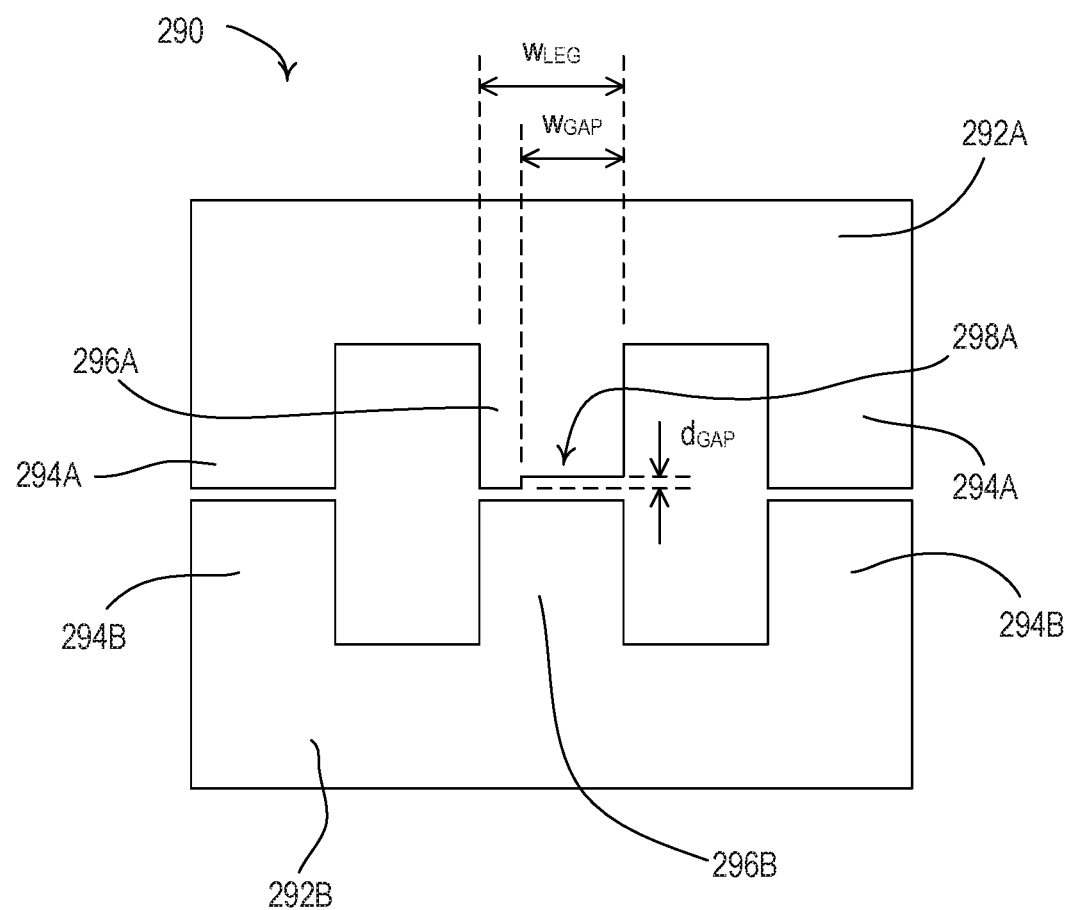
FIG. 6 is an example diagram illustrating a magnetic core set of an energy-storage inductor of a forward converter.

FIG. 6 is an example diagram illustrating a magnetic core set 290 of an energy-storage inductor (e.g., the output energy-storage inductor L226 of the forward converter 240 shown in FIG. 5). The magnetic core set 290 may comprise two E-cores 292A, 292B, and may comprise part number PC40EE16-Z, manufactured by TDK Corporation. The E-cores 292A, 292B may comprise respective outer legs 294A, 294B and inner legs 296A, 296B. The inner legs 296A, 296B may be characterized by a width $w_{LEG}$ (e.g., approximately 4 mm). The inner leg 296A of the first E-core 292A may comprise a partial gap 298A (e.g., the magnetic core set 290 may be partially-gapped), such that the inner legs 296A, 296B may be spaced apart by a gap distance $d_{GAP}$ (e.g., approximately 0.5 mm). The partial gap 298A may extend for a gap width $w_{GAP}$ (e.g., approximately 2.8 mm) such that the partial gap 298A may extend for approximately 70% of the leg width $w_{LEG}$ of the inner leg 296A. Either or both of the inner legs 296A, 296B may comprise partial gaps. The partially-gapped magnetic core set 290 (e.g., as shown in FIG. 6) may allow the output energy-storage inductor L226 of the forward converter 240 (e.g., shown in FIG. 5) to maintain continuous current at low load conditions (e.g., near the low-end intensity $L_{LE}$).

Figure 7:
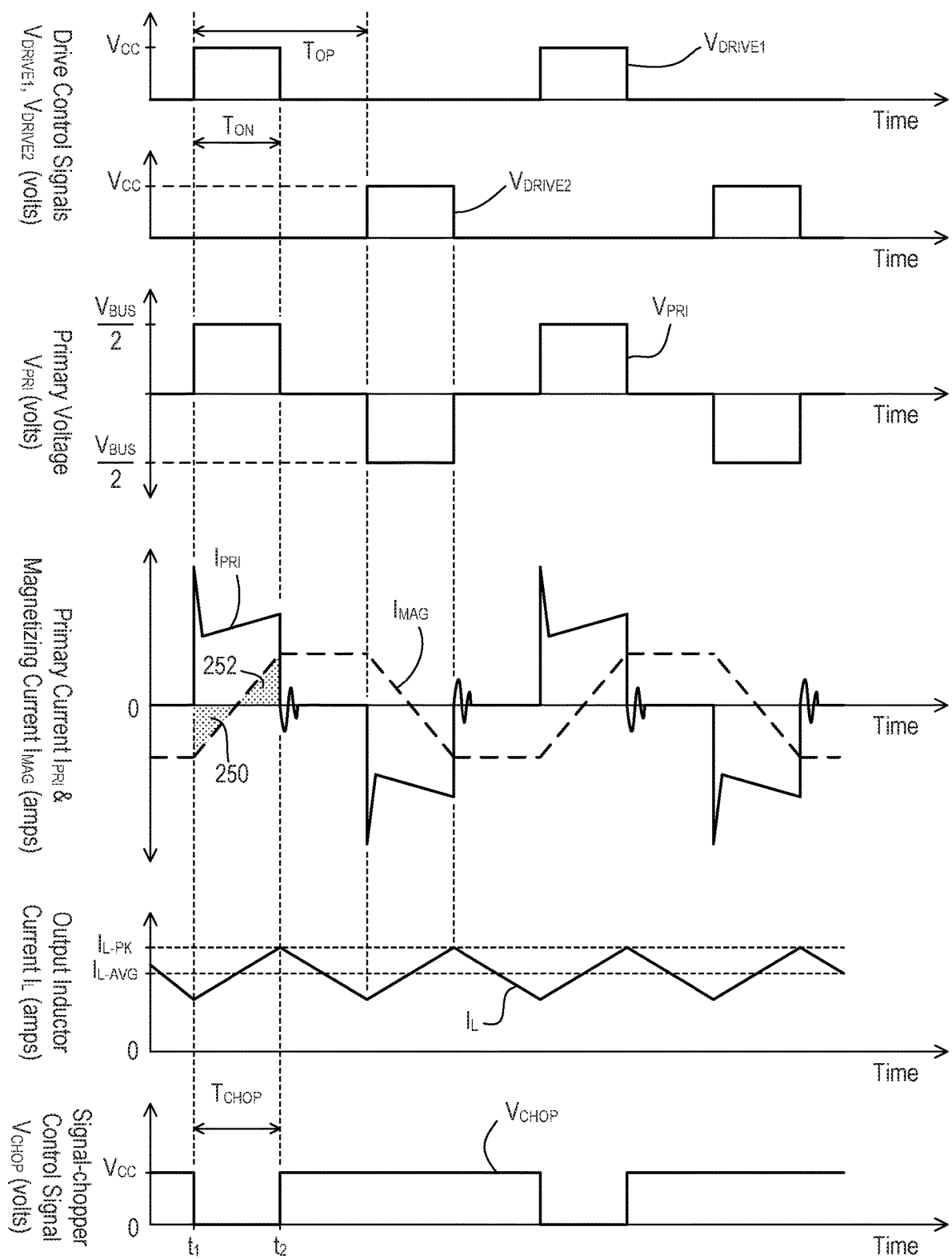
FIG. 7 shows example waveforms illustrating the operation of a forward converter and a current sense circuit when the intensity of an LED light source is near a high-end intensity.

FIG. 7 shows example waveforms illustrating the operation of a forward converter (e.g., the forward converter 240) and a current sense circuit (e.g., the current sense circuit 260). The forward converter 240 may generate the waveforms shown in FIG. 7, for example, when operating in the normal mode and in the active state of the burst mode as described herein. As shown in FIG. 7, a control circuit (e.g., the control circuit 150) may drive the respective drive control signals $V_{DRIVE1}$, $V_{DRIVE2}$ high to approximately the supply voltage $V_{CC}$ to render the respective FETs Q210, Q212 conductive for an on time $T_{ON}$. The FETs Q210, Q212 may be rendered conductive at different times. When the high-side FET Q210 is conductive, the primary winding of the transformer 220 may conduct a primary current $I_{PRI}$ to circuit common through the capacitor C216 and sense resistor 8222. After (e.g., immediately after) the high-side FET Q210 is rendered conductive (at time $t_1$ in FIG. 7), the primary current $I_{PRI}$ may conduct a short high-magnitude pulse of current due to the parasitic capacitance $C_{P3}$ of the transformer 220 as shown in FIG. 7. While the high-side FET Q210 is conductive, the capacitor C216 may charge, such that a voltage having a magnitude of approximately half of the magnitude of the bus voltage $V_{BUS}$ may be developed across the capacitor. The magnitude of the primary voltage $V_{PRI}$ across the primary winding of the transformer 220 may be equal to approximately half of the magnitude of the bus voltage $V_{BUS}$ (e.g., $V_{BUS}/2$). When the low-side FET Q212 is conductive, the primary winding of the transformer 220 may conduct the primary current $I_{PRI}$ in an opposite direction and the capacitor C216 may be coupled across the primary winding, such that the primary voltage $V_{PRI}$ may have a negative polarity with a magnitude equal to approximately half of the magnitude of the bus voltage $V_{BUS}$.

When either of the high-side and low-side FETs Q210, Q212 are conductive, the magnitude of an output inductor current $I_L$ conducted by the output inductor L226 and/or the magnitude of the load voltage $V_{LOAD}$ across the LED light source 202 may increase with respect to time. The magnitude of the primary current $I_{PRI}$ may increase with respect to time while the FETs Q210, Q212 are conductive (e.g., after an initial current spike). When the FETs Q210, Q212 are non-conductive, the output inductor current $I_L$ and the load voltage $V_{LOAD}$ may decrease in magnitude with respective to time. The output inductor current $I_L$ may be characterized by a peak magnitude $I_{L-PK}$ and an average magnitude $I_{L-AVG}$, for example, as shown in FIG. 7. The control circuit 150 may increase and/or decrease the on times $T_{ON}$ of the drive control signals $V_{DRIVE1}$, $V_{DRIVE2}$ (e.g., and the duty cycle $DC_{INV}$ of the inverter voltage $V_{INV}$) to respectively increase and decrease the average magnitude $I_{L-AVG}$ of the output inductor current $I_L$, and thus respectively increase and decrease the intensity of the LED light source 202.

When the FETs Q210, Q212 are rendered non-conductive, the magnitude of the primary current $I_{PRI}$ may drop toward zero amps (e.g., as shown at time $t_2$ in FIG. 7 when the high-side FET Q210 is rendered non-conductive). A magnetizing current $I_{MAG}$ may continue to flow through the primary winding of the transformer 220, for example, due to the magnetizing inductance $L_{MAG}$ of the transformer. When the target intensity $L_{TRGT}$ of the LED light source 102 is near the low-end intensity $L_{LE}$, the magnitude of the primary current $I_{PRI}$ may oscillate after either of the FETs Q210, Q212 is rendered non-conductive. The oscillation may be caused by the parasitic capacitances $C_{P1}$, $C_{P2}$ of the FETs, the parasitic capacitance $C_{P3}$ of the primary winding of the transformer 220, and/or any other parasitic capacitances of the circuit (e.g., such as the parasitic capacitances of the printed circuit board on which the forward converter 240 is mounted).

The real component of the primary current $I_{PRI}$ may indicate the magnitude of the secondary current $I_{SEC}$ and thus the intensity of the LED light source 202. The magnetizing current $I_{MAG}$ (e.g., the reactive component of the primary current $I_{PRI}$) may flow through the sense resistor R222. When the high-side FET Q210 is conductive, the magnetizing current $I_{MAG}$ may change from a negative polarity to a positive polarity. When the low-side FET Q210 is conductive, the magnetizing current $I_{MAG}$ may change from a positive polarity to a negative polarity. When the magnitude of the primary voltage $V_{PRI}$ is zero volts, the magnetizing current $I_{MAG}$ may remain constant, for example, as shown in FIG. 7. The magnetizing current $I_{MAG}$ may have a maximum magnitude defined by the following equation:

$$I_{MAG-MAX} = \frac{V_{BUS} \cdot T_{HC}}{4 \cdot L_{MAG}},$$

where $T_{HC}$ may be the half-cycle period of the inverter voltage $V_{INV}$, e.g., $T_{HC}=T_{OP}/2$. As shown in FIG. 7, the areas 250, 252 may be approximately equal, such that the average value of the magnitude of the magnetizing current $I_{MAG}$ may be zero during the period of time when the magnitude of the primary voltage $V_{PRI}$ is greater than approximately zero volts (e.g., during the on time $T_{ON}$ as shown in FIG. 7).

The current sense circuit 260 may determine an average of the primary current $I_{PRI}$ during the positive cycles of the inverter voltage $V_{INV}$, e.g., when the high-side FET Q210 is conductive. As described herein, the high-side FET Q210 may be conductive during the on time $T_{ON}$. The load current feedback signal $V_{I-LOAD}$, which may be generated by the current sense circuit 260, may have a DC magnitude that is the average value of the primary current $I_{PRI}$ (e.g., when the high-side FET Q210 is conductive). Because the average value of the magnitude of the magnetizing current $I_{MAG}$ may be approximately zero during the period of time that the high-side FET Q210 is conductive (e.g., during the on time $T_{ON}$), the load current feedback signal $V_{I-LOAD}$ generated by the current sense circuit may indicate the real component (e.g., only the real component) of the primary current $I_{PRI}$ (e.g., during the on time $T_{ON}$).

When the high-side FET Q210 is rendered conductive, the control circuit 150 may drive the signal-chopper control signal $V_{CHOP}$ low towards circuit common to render the transistor Q236 of the current sense circuit 260 non-conductive for a signal-chopper time $T_{CHOP}$. The signal-chopper time $T_{CHOP}$ may be approximately equal to the on time $T_{ON}$ of the high-side FET Q210, for example, as shown in FIG. 7. The capacitor C230 may charge from the sense voltage $V_{SENSE}$ through the resistors 8232, 8234 while the signal-chopper control signal $V_{CHOP}$ is low. The magnitude of the load current feedback signal $V_{I-LOAD}$ may be the average value of the primary current $I_{PRI}$ and may indicate the real component of the primary current during the time when the high-side FET Q210 is conductive. When the high-side FET Q210 is not conductive, the control circuit 150 may drive the signal-chopper control signal $V_{CHOP}$ high to render the transistor Q236 conductive. Accordingly, the control circuit 150 may be able to determine the average magnitude of the load current $I_{LOAD}$ from the magnitude of the load current feedback signal $V_{I-LOAD}$, at least partially because the effects of the magnetizing current $I_{MAG}$ and the oscillations of the primary current $I_{PRI}$ on the magnitude of the load current feedback signal $V_{I-LOAD}$ may be reduced or eliminated.

As the target intensity $L_{TRGT}$ of the LED light source 202 is decreased towards the low-end intensity $L_{LE}$ and/or the on times $T_{ON}$ of the drive control signals $V_{DRIVE1}$, $V_{DRIVE2}$ get smaller, the parasitic of the load regulation circuit 140 (e.g., the parasitic capacitances $C_{P1}$, $C_{P2}$ of the FETs Q210, Q212, the parasitic capacitance $C_{P3}$ of the primary winding of the transformer 220, and/or other parasitic capacitances of the circuit) may cause the magnitude of the primary voltage $V_{PRI}$ to slowly decrease towards zero volts after the FETs Q210, Q212 are rendered non-conductive.

Figure 8:
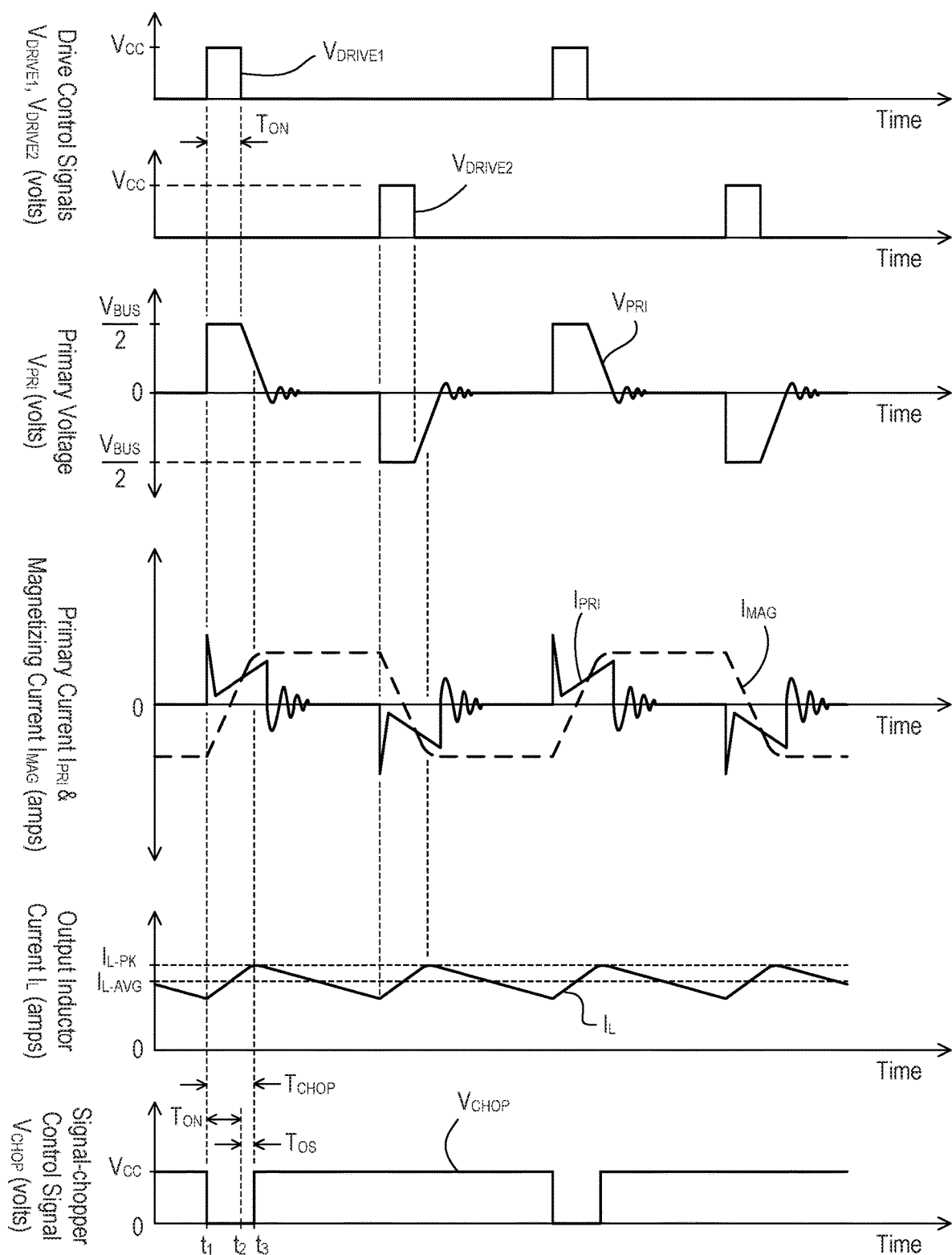
FIG. 8 shows example waveforms illustrating the operation of a forward converter and a current sense circuit when the intensity of an LED light source is near a low-end intensity.

FIG. 8 shows example waveforms illustrating the operation of a forward converter and a current sense circuit (e.g., the forward converter 240 and the current sense circuit 260) when the target intensity $L_{TRGT}$ is near the low-end intensity $L_{LE}$, and when the forward converter 240 is operating in the normal mode and the active state of the burst mode. The gradual drop off in the magnitude of the primary voltage $V_{PRI}$ may allow the primary winding of the transformer 220 to continue to conduct the primary current $I_{PRI}$, such that the transformer 220 may continue to deliver power to the secondary winding after the FETs Q210, Q212 are rendered non-conductive, for example, as shown in FIG. 8. The magnetizing current $I_{MAG}$ may continue to increase in magnitude after the on time $T_{ON}$ of the drive control signal $V_{DRIVE1}$ (e.g., and/or the drive control signal $V_{DRIVE2}$). The control circuit 150 may increase the signal-chopper time $T_{CHOP}$ to be greater than the on time $T_{ON}$. For example, the control circuit 150 may increase the signal-chopper time $T_{CHOP}$ (e.g., during which the signal-chopper control signal $V_{CHOP}$ is low) by an offset time $T_{OS}$ when the target intensity $L_{TRGT}$ of the LED light source 202 is near the low-end intensity $L_{LE}$.

Figure 9:
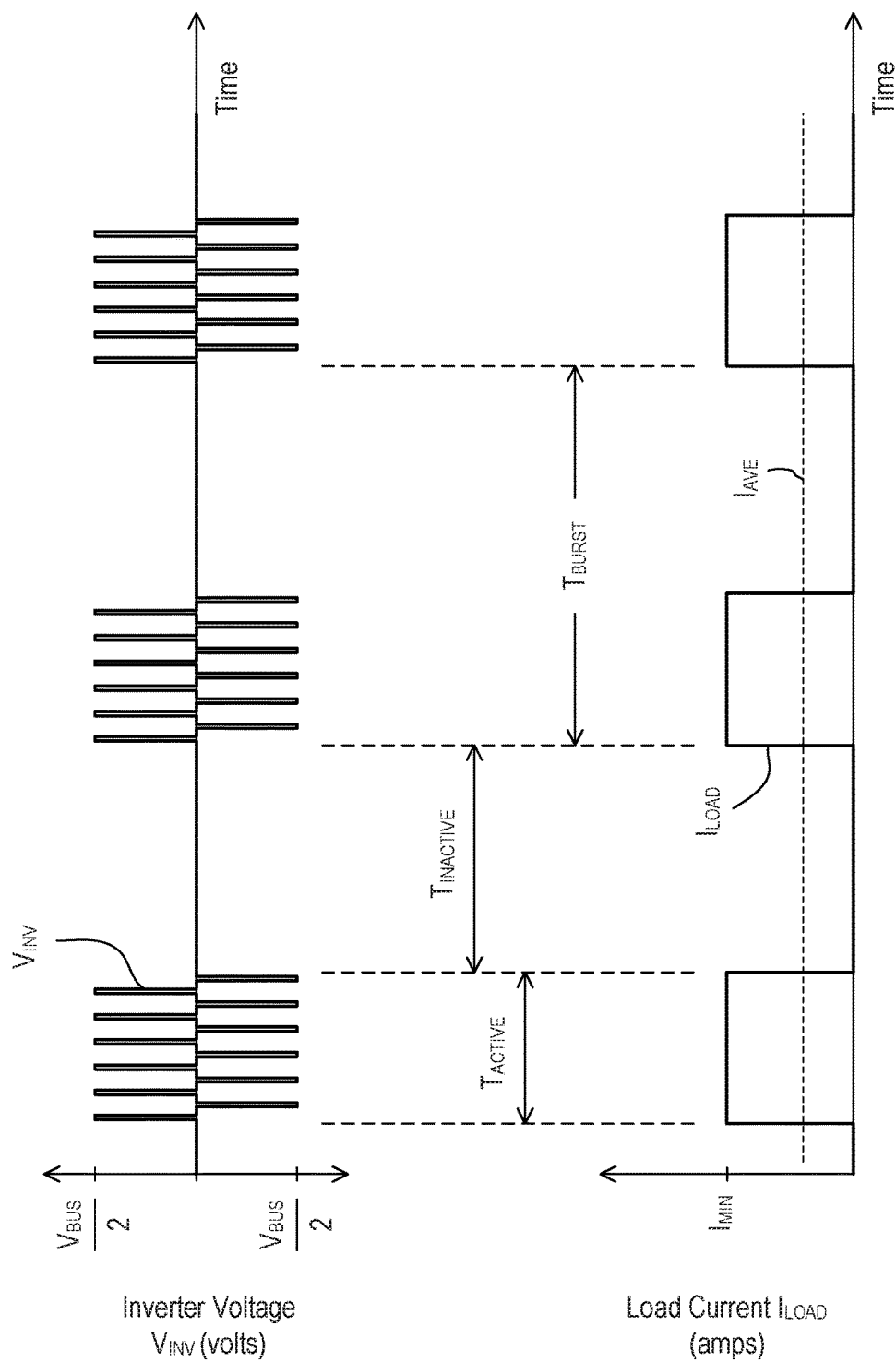
FIG. 9 shows example waveforms illustrating the operation of a forward converter of an LED driver when operating in a burst mode.

FIG. 9 shows example waveforms illustrating the operation of a forward converter (e.g., the forward converter 240 shown in FIG. 5) when operating in a burst mode. The inverter circuit of the forward converter 240 may generate the inverter voltage $V_{INV}$ during an active state (e.g., for the duration of an active state period $T_{ACTIVE}$). A purpose of the inverter voltage $V_{INV}$ may be to regulate the magnitude of the load current $I_{LOAD}$ to the minimum rated current $I_{MIN}$ during the active state period. During an inactive state period, the inverter voltage $V_{INV}$ may be reduced to zero (e.g., not generated). The forward converter may enter the active state on a periodic basis with an interval approximately equal to a burst mode period $T_{BURST}$ (e.g., approximately 4.4 milliseconds). The active state period $T_{ACTIVE}$ and inactive state period $T_{INACTIVE}$ may be characterized by durations that are dependent upon a burst duty cycle $DC_{BURST}$, e.g., $T_{ACTIVE}=DC_{BURST} \cdot T_{BURST}$ and $T_{INACTIVE}=(1-DC_{BURST}) \cdot T_{BURST}$. The average magnitude $I_{AVE}$ of the load current $I_{LOAD}$ may be dependent on the burst duty cycle $DC_{BURST}$. For example, the average magnitude $I_{AVE}$ of the load current $I_{LOAD}$ may be equal to the burst duty cycle $DC_{BURST}$ times the load current $I_{LOAD}$ (e.g., $I_{AVE}=DC_{BURST} \cdot I_{LOAD}$). When the load current $I_{LOAD}$ is equal to the minimum load current $I_{MIN}$, the average magnitude $I_{AVE}$ of the load current $I_{LOAD}$ may be equal to $I_{AVE}=DC_{BURST} \cdot I_{MIN}$.

The burst duty cycle $DC_{BURST}$ may be controlled to adjust the average magnitude $I_{AVE}$ of the load current $I_{LOAD}$. The burst duty cycle $DC_{BURST}$ may be controlled in different ways. For example, the burst duty cycle $DC_{BURST}$ may be controlled by holding the burst mode period $T_{BURST}$ constant and varying the length of the active state period $T_{ACTIVE}$. The burst duty cycle $DC_{BURST}$ may also be controlled by holding the active state period $T_{ACTIVE}$ constant and varying the length of the inactive state period $T_{INACTIVE}$ (and thus varying the length of the burst mode period $T_{BURST}$). As the burst duty cycle $DC_{BURST}$ is increased, the average magnitude $I_{AVE}$ of the load current $I_{LOAD}$ may increase. As the burst duty cycle $DC_{BURST}$ is decreased, the average magnitude $I_{AVE}$ of the load current $I_{LOAD}$ may decrease. The control circuit 150 may be configured to adjust the burst duty cycle $DC_{BURST}$ using open loop control (e.g., in response to the target intensity $L_{TRGT}$). The control circuit 150 may be configured to adjust the burst duty cycle $DC_{BURST}$ using closed loop control (e.g., in response to the load current feedback signal $V_{I-LOAD}$).

Figure 10:
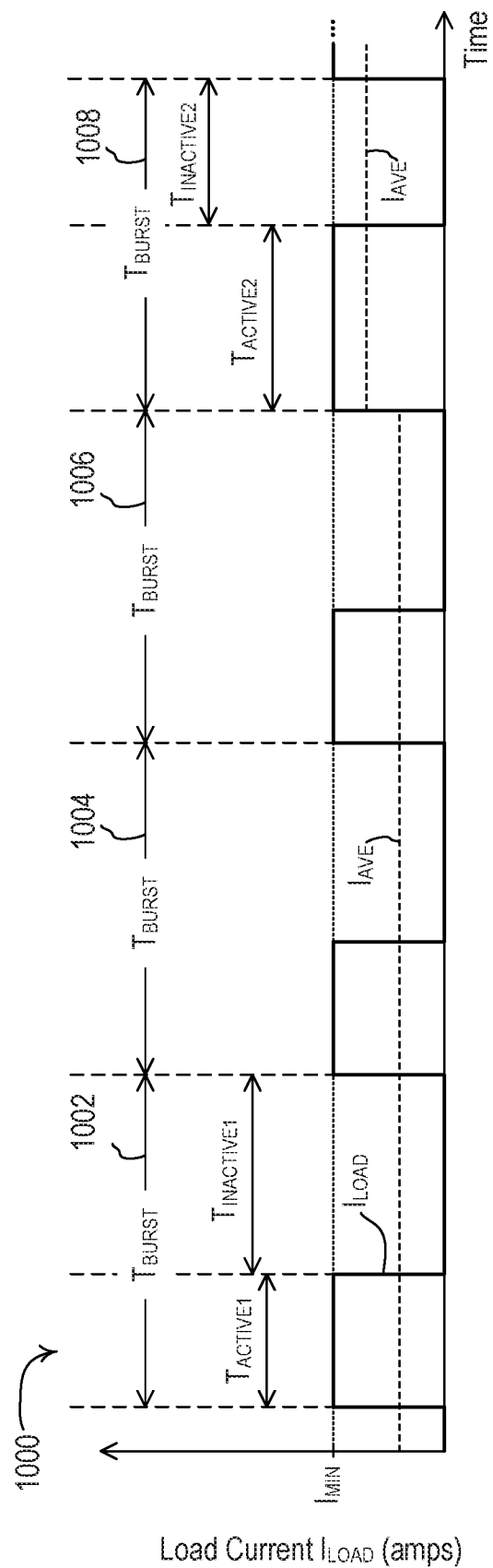
FIG. 10 is a diagram of an example waveform illustrating a load current when a load regulation circuit is operating in a burst mode.

FIG. 10 shows a diagram of an example waveform 1000 illustrating the load current $I_{LOAD}$ when a load regulation circuit (e.g., the load regulation circuit 140) is operating in a burst mode, for example, as the target intensity $L_{TRGT}$ of a light source (e.g., the LED light source 202) is being increased (e.g., from the low-end intensity $L_{LE}$). A control circuit (e.g., the control circuit 150 of the LED driver 100 shown in FIG. 1 and/or the control circuit 150 controlling the forward converter 240 and the current sense circuit 260 shown in FIG. 5) may adjust the length of the active state period $T_{ACTIVE}$ of the burst mode period $T_{BURST}$ by adjusting the burst duty cycle $DC_{BURST}$. Adjusting the length of the active state period $T_{ACTIVE}$ may adjust the average magnitude $I_{AVE}$ of the load current $I_{LOAD}$, and in turn the intensity of the light source.

The active state period $T_{ACTIVE}$ of the load current $I_{LOAD}$ may have a length that is dependent upon the length of an inverter cycle of the inverter circuit of the load regulation circuit (e.g., the operating period $T_{OP}$). For example, the active state period $T_{ACTIVE}$ may comprise six inverter cycles, and as such, may have a length that is equal to the duration of the six inverter cycles. The control circuit may adjust (e.g., increase or decrease) the length of the active state periods $T_{ACTIVE}$ by adjusting the number of inverter cycles in the active state period $T_{ACTIVE}$. As such, the control circuit may adjust the length of the active state periods $T_{ACTIVE}$ by predetermined increments/decrements, e.g., with each increment/decrement corresponding to approximately the length of an inverter cycle (e.g., such as the transition operating period $T_{OP-T}$, which may be approximately 12.8 microseconds). Since the average magnitude $I_{AVE}$ of the load current $I_{LOAD}$ may depend on the active state period $T_{ACTIVE}$, the average magnitude $I_{AVE}$ may also be adjusted by a predetermined increment/decrement that corresponds to a change in the load current $I_{LOAD}$ resulting from the addition or removal of an inverter cycle per active state period $T_{ACTIVE}$.

FIG. 10 shows four burst mode periods $T_{BURST}$ 1002, 1004, 1006, 1008 with equivalent length. The first three burst mode periods $T_{BURST}$ 1002, 1004, 1006 may be characterized by equivalent active state periods $T_{ACTIVE1}$ (e.g., with the same number of inverter cycles) and equivalent inactive state periods $T_{INACTIVE1}$. The fourth burst mode period $T_{BURST}$ 1008 may be characterized by an active state period $T_{ACTIVE2}$ that is larger than the active state periods $T_{ACTIVE1}$ (e.g., by one more inverter cycle), and an inactive state period $T_{INACTIVE2}$ that is smaller than the inactive state period $T_{INACTIVE1}$ (e.g., by one fewer inverter cycle). The larger active state period $T_{ACTIVE2}$ and smaller inactive state period $T_{INACTIVE2}$ may result in a larger duty cycle and a corresponding larger average magnitude $I_{AVE}$ of the load current $I_{LOAD}$ (e.g., as shown during burst mode period 1008). As the average magnitude $I_{AVE}$ of the load current $I_{LOAD}$ increases, the intensity of the light source may increase accordingly. Hence, as shown in FIG. 10, by adding inverter cycles to or removing inverter cycles from the active state periods $T_{ACTIVE}$ while maintaining the length of the burst mode periods $T_{BURST}$, the control circuit may adjust the average magnitude $I_{AVE}$ of the load current $I_{LOAD}$. Such adjustments to only the active state periods $T_{ACTIVE}$, however, may cause changes in the intensity of the lighting load that are perceptible to the user, e.g., when the target intensity is equal to or below the transition intensity $L_{TRAN}$.

Figure 11:
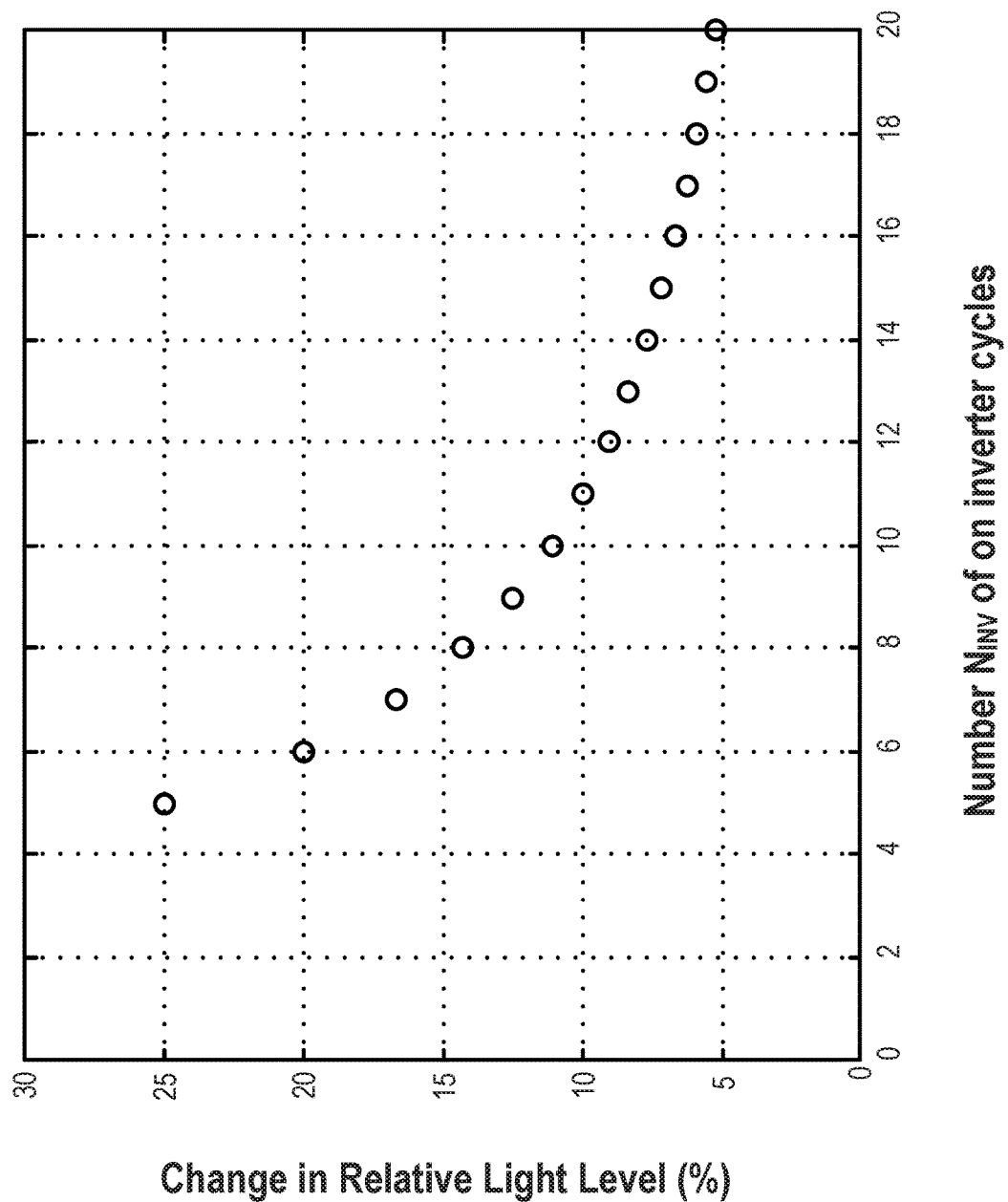
FIG. 11 is an example plot showing how a relative average light level may change as a function of the number of inverter cycles included in an active state period when a load regulation circuit is operating in a burst mode.

FIG. 11 illustrates how the relative average light intensity of a light source may change as a function of the number $N_{INV}$ of inverter cycles included in an active state period $T_{ACTIVE}$ if the control circuit only adjusts the active state periods $T_{ACTIVE}$ during the burst mode. As described herein, $T_{ACTIVE}$ may be expressed as $T_{ACTIVE}=N_{INV} \cdot T_{OP-LE}$, wherein $T_{OP-LE}$ may represent a low-end operating period of the relevant inverter circuit. As shown in FIG. 11, if the control circuit adjusts the length of the active state periods $T_{ACTIVE}$ from four to five inverter cycles, the relative light intensity may change by approximately 25%. If the control circuit adjusts the length of the active state periods $T_{ACTIVE}$ from five to six inverter cycles, the relative light intensity may change by approximately 20%.

Fine tuning of the light level or light intensity of the lighting load may be achieved by configuring the control circuit to adjust (e.g., increase or decrease) the length of the inactive state periods $T_{INACTIVE}$ in the burst mode. Adjustments to the length of the inactive state periods $T_{INACTIVE}$ may be made between adjusting the length of the active state periods $T_{ACTIVE}$. Adjustments to the length of the inactive state periods $T_{INACTIVE}$ may also be made while adjusting the length of the active state periods $T_{ACTIVE}$. The adjustments to the inactive state periods $T_{INACTIVE}$ may be made in one or more steps with respective adjustment amounts. The respective adjustment amounts may be substantially equal to or different from each other. The respective adjustment amounts may be determined such that an adjustment made to the inactive state periods will cause a same or smaller change to the light intensity (e.g., a smaller change relative to a specific light intensity level) than an adjustment to active state periods (e.g., by one inverter cycle) would have caused had the inactive state periods not been changed. In an example, one or more of the respective adjustment amounts made to the inactive state periods may be smaller than an adjustment amount made to the active state periods. In an example, the respective adjustment amounts made to the inactive state periods may not be smaller than the adjustment amount made to the active state periods, but the changes caused by the respective inactive adjustment amounts to the relative light intensity may still be smaller than the change caused by the active state adjustment amount. The control circuit may adjust the length of the inactive state periods $T_{INACTIVE}$ as a function of the target intensity $L_{TRGT}$ of the lighting load.

Figure 12:
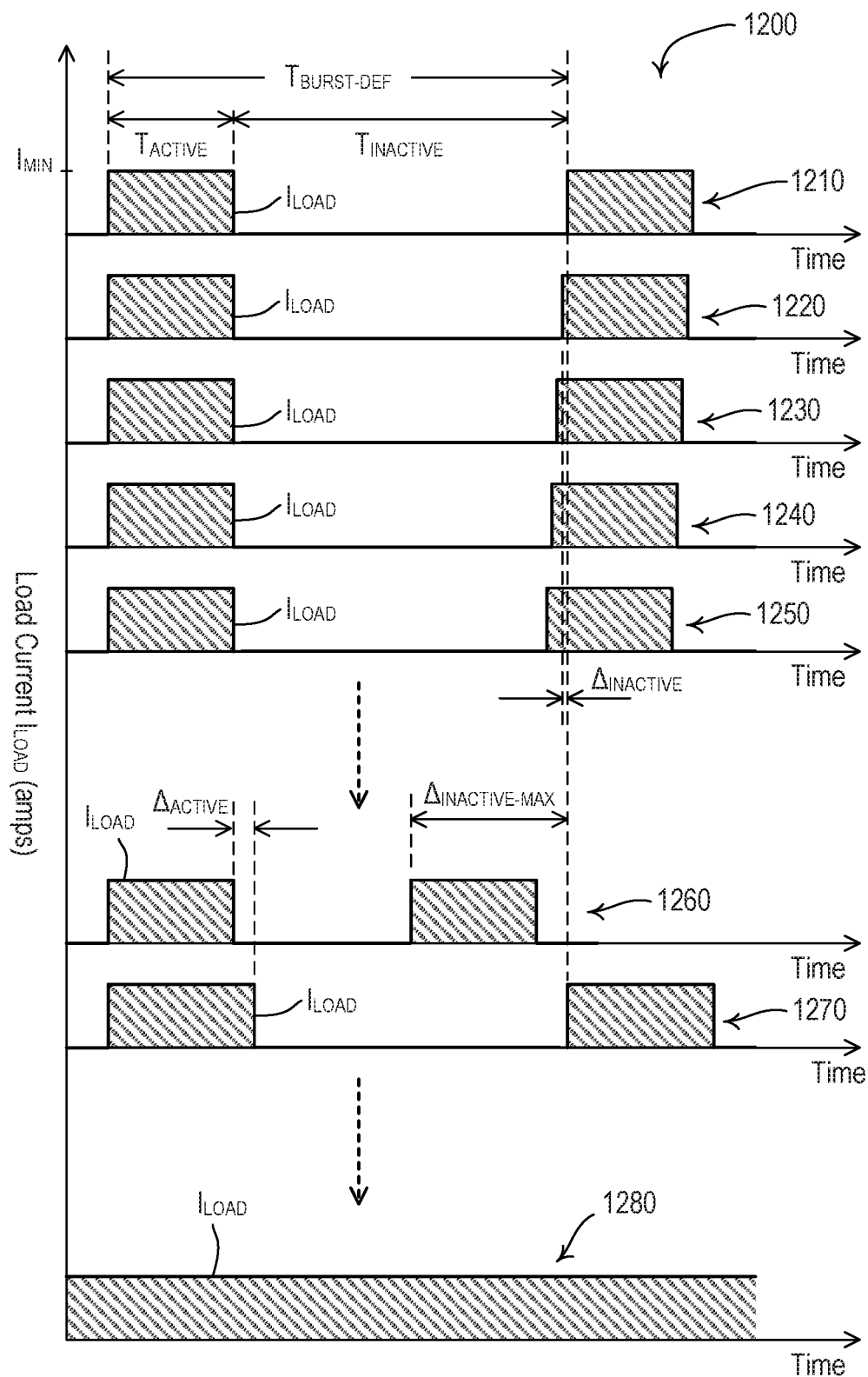
FIG. 12 shows example waveforms illustrating a load current when a load regulation circuit of an LED driver is operating in a burst mode.

FIG. 12 shows example waveforms 1210-1280 illustrating the load current $I_{LOAD}$ when a load regulation circuit (e.g., the load regulation circuit 140) is controlled (e.g., by the control circuit 150) to operate in the burst mode. More specifically, the illustrated example shows that the control circuit may adjust the target intensity $L_{TRGT}$ of the light source (e.g., the LED light source 202) by first adjusting the length of the inactive state periods and then adjusting the length of the active state periods. By using the control technique shown in FIG. 12, the control circuit may accomplish fine dimming of the lighting load.

As shown in FIG. 12, the control circuit may control the load current $I_{LOAD}$ to have a default burst mode period $T_{BURST-DEF}$ (e.g., as shown in waveform 1210). For example, the default burst mode period $T_{BURST-DEF}$ may be approximately 800 microseconds to correspond to a frequency of approximately 1.25 kHz. The inverter circuit comprised in the load regulation circuit may be characterized by an operating frequency $f_{OP-BURST}$ (e.g., approximately 25 kHz) and an operating period $T_{OP-BURST}$ (e.g., approximately 40 microseconds). The control circuit may adjust the length of the inactive state periods $T_{INACTIVE}$ gradually, for example, between adjusting the length of the active state periods $T_{ACTIVE}$. The adjustment to the length of the inactive state periods $T_{INACTIVE}$ may be made in one or more steps (e.g., over one or more adjacent or separate burst mode periods) with respective inactive state adjustment amounts $\Delta_{INACTIVE}$. The respective inactive state adjustment amounts may be substantially the same for each step or may be different for different steps, so long as the adjustments may allow fine tuning of the light intensity of the lighting load. For example, the inactive-state adjustment amount $\Delta_{INACTIVE}$ may be equal to a percentage (e.g., approximately 1%) of the default burst mode period $T_{BURST-DEF}$ (e.g., approximately 8 microseconds).

The control circuit may adjust the length of the inactive state periods $T_{INACTIVE}$ (e.g., by the inactive-state adjustment amount $\Delta_{INACTIVE}$ each time) while maintaining the length of the active state period $T_{ACTIVE}$ constant (as shown in waveforms 1210-1260 in FIG. 12). When the length of the inactive state periods $T_{INACTIVE}$ has been adjusted by a threshold amount (e.g., a maximum adjustment amount $\Delta_{INACTIVE-MAX}$, as shown in waveform 1260), the control circuit may adjust the length of the active state periods $T_{ACTIVE}$ by an active state adjustment amount $\Delta_{ACTIVE}$ (e.g., by one additional inverter cycle length) in a succeeding burst mode period, for example. The control circuit may adjust the length of the inactive state periods (e.g., in the same succeeding burst mode period) such that the length of the burst mode period $T_{BURST}$ may revert back to that of the default burst mode period $T_{BURST-DEF}$, and the length of the inactive state periods $T_{INACTIVE}$ may be equal to the difference between the default burst mode period $T_{BURST-DEF}$ and the present length of the active state periods $T_{ACTIVE}$ (as shown in waveform 1270 of FIG. 12). The control circuit may then go back to adjusting the length of the inactive state periods $T_{INACTIVE}$ as described herein until the length of the inactive state periods $T_{INACTIVE}$ has once again been adjusted by the maximum adjustment amount $\Delta_{INACTIVE-MAX}$. At that point, the control circuit may adjust the length of the active state periods $T_{ACTIVE}$ and/or the length of the inactive state periods $T_{INACTIVE}$ such that the burst mode period $T_{BURST}$ may again be adjusted back to the default burst mode period $T_{BURST-DEF}$. Eventually, the burst duty cycle $DC_{BURST}$ may reach approximately 100% (e.g., as shown in waveform 1280) and the light intensity of the lighting load may reach the transition intensity $L_{TRAN}$. Beyond that point, the control circuit may begin adjusting the target load current $I_{TRGT}$ in the normal mode (e.g., via PWM or CCR).

As described herein, the user's eyes may be more sensitive to changes in the relative light level of the lighting load when the light level is low (e.g., below to the transition intensity $L_{TRAN}$). The maximum adjustment amount $\Delta_{INACTIVE-MAX}$ for the inactive state periods $T_{INACTIVE}$ may be sized to reduce perceptible changes in the relative light level of the lighting load. For example, if the lengths of the active state periods $T_{ACTIVE}$ and the inactive state periods $T_{INACTIVE}$ are both adjusted (e.g., between waveforms 1260 and 1270 in FIG. 12), a properly sized maximum adjustment amount $\Delta_{INACTIVE-MAX}$ may enable a smooth transition from a current intensity level into the next intensity level. The maximum adjustment amount $\Delta_{INACTIVE-MAX}$ may be determined as a function of the present length of the active state period $T_{ACTIVE}$ (e.g., the number of inverter cycles included in the active state period $T_{ACTIVE}$). The determination may be made by calculating a value for the maximum adjustment amount $\Delta_{INACTIVE-MAX}$ in real-time or by retrieving a predetermined value from memory (e.g., from a lookup table). In an example, when the active state period $T_{ACTIVE}$ presently includes four inverter cycles, the maximum adjustment amount $\Delta_{INACTIVE-MAX}$ may be approximately equal to the change in the relative light level when the length of the active state period $T_{ACTIVE}$ changes from four to five inverter cycles (e.g., 25% as shown in FIG. 11). In another example, the maximum adjustment amount $\Delta_{INACTIVE-MAX}$ may be approximately equal to the burst operating period $T_{OP-BURST}$ of the inverter circuit (e.g., approximately 40 microseconds). The control circuit may store the value of the maximum adjustment amount $\Delta_{INACTIVE-MAX}$ in memory (e.g., in a lookup table)

Figure 13:
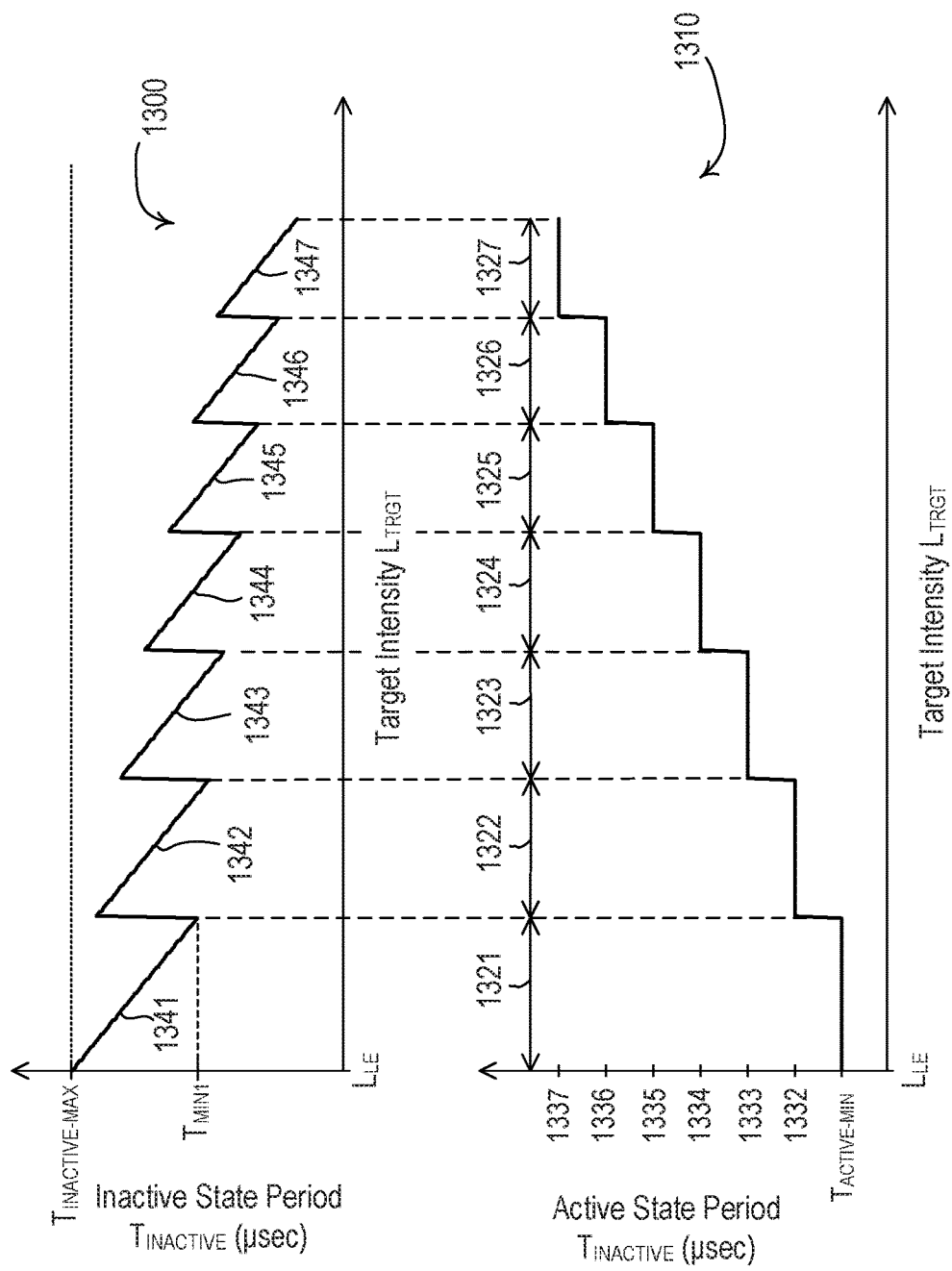
FIG. 13 is an example of a plot relationship between a target load current and the lengths of an active state period and an inactive state period when a load regulation circuit of an LED driver is operating in a burst mode.

FIG. 13 shows two example plot relationships depicting how a target light intensity of the lighting load may change in accordance with changes in the lengths of the active and inactive state periods when a load regulation circuit (e.g., the load regulation circuit 140) is controlled (e.g., by the control circuit 150) to operate in the burst mode. Plot 1300 shows an example relationship between the length of the inactive state period $T_{INACTIVE}$ and the target intensity $L_{TRGT}$ of the lighting load. Plot 1310 shows an example relationship between the length of the active state period $T_{ACTIVE}$ and the target intensity $L_{TRGT}$ of the lighting load. The length of the active state period $T_{ACTIVE}$ may be expressed in time terms or in terms of the number of inverter cycles $N_{INV}$ included in the active state period $T_{ACTIVE}$, for example.

As described herein, the control circuit (e.g., the control circuit 150 of the LED driver 100 shown in FIG. 1 and/or the control circuit 150 controlling the forward converter 240 and the current sense circuit 260 shown in FIG. 5) may determine the magnitude of the target load current $I_{TRGT}$ and/or the burst duty cycle $DC_{BURST}$ based on the target intensity $L_{TRGT}$. The control circuit may determine the target intensity $L_{TRGT}$, for example, via a digital message received via the communication circuit 180, via a phase-control signal received from a dimmer switch, and/or the like. The target intensity $L_{TRGT}$ may be constant or may be changing (e.g., fading) from one intensity level to another. The control circuit may determine the length of the active state period $T_{ACTIVE}$ based on the target intensity $L_{TRGT}$. After determining the length of the active state period $T_{ACTIVE}$, the control circuit may determine the length of the inactive state period $T_{INACTIVE}$ that may be used with the present active state period $T_{ACTIVE}$ such that the light source may be driven to the target intensity $L_{TRGT}$. The control circuit may determine the lengths of the active state period $T_{ACTIVE}$ and/or the inactive state period $T_{INACTIVE}$ by calculating the values in real-time and/or retrieving the values from memory (e.g., via a lookup table or the like).

Referring to FIG. 13, if the control circuit determines that the target intensity $L_{TRGT}$ falls within the range 1321, then the control circuit may determine to set the burst mode period to a default burst mode period (e.g., such as $T_{BURST-DEF}$, which may be approximately 800 microseconds) and the active state period $T_{ACTIVE}$ to a minimum active state period $T_{ACTIVE-MIN}$ (e.g., including four inverter cycles). The control circuit may determine to set the inactive state period $T_{INACTIVE}$ according to the profile 1341, which may range from a maximum inactive state period $T_{INACTIVE-MAX}$ to a minimum inactive state period $T_{MIN1}$. The maximum inactive state period $T_{INACTIVE-MAX}$ may be determined based on the length of the present burst operating period (e.g., the default burst mode period $T_{BURST-DEF}$) and/or the length of the present active state period $T_{ACTIVE-MIN}$. The minimum inactive state period $T_{MIN1}$ may be determined based on the maximum inactive state adjustment amount $\Delta_{INACTIVE-MAX}$, which may in turn be dependent upon the length of the present active state period $T_{ACTIVE-MIN}$. The gradient of the profile 1341 may be determined based on the size of an inactive state adjustment step (e.g., such as the inactive state adjustment amount $\Delta_{INACTIVE}$), which, may be equal to a percentage (e.g., approximately 1%) of the default burst mode period $T_{BURST-DEF}$, for example. As noted herein, the control circuit may determine the lengths of the active state period $T_{ACTIVE}$ and/or the inactive state period $T_{INACTIVE}$ by calculating the values in real-time and/or retrieving the values from memory.

If the control circuit determines that the target intensity $L_{TRGT}$ falls within the range 1322, then the control circuit may determine to set the active state period $T_{ACTIVE}$ to 1332. The active state period 1332 may be greater than the minimum active state period $T_{ACTIVE-MIN}$. For example, the active state period 1332 may include one more inverter cycle than the minimum active state period $T_{ACTIVE-MIN}$. The control circuit may determine to set the inactive state period $T_{INACTIVE}$ according to the profile 1342. In an example, the starting point of the profile 1342 may be dependent upon the length of the present burst cycle period (e.g., the default burst cycle period $T_{BURST-DEF}$) and the length of the present active state period 1332. The ending point of the profile 1342 may be dependent upon the maximum inactive state adjustment amount $\Delta_{INACTIVE-MAX}$, which may in turn be dependent upon the length of the present active state period 1332. The gradient of the profile 1342 may be determined based on the size of an inactive-state adjustment step (e.g., such as the inactive-state adjustment amount $\Delta_{INACTIVE}$), which, as noted herein, may be equal to a percentage (e.g., approximately 1%) of the default burst mode period $T_{BURST-DEF}$. Similarly, if the control circuit determines that the target intensity $L_{TRGT}$ falls within one of the target intensity ranges 1323-1327, then the control circuit may determine to set the active state period $T_{ACTIVE}$ to one of 1333-1337 and determine to set the inactive state period $T_{INACTIVE}$ according to one of the profiles 1343-1347, respectively.

The profiles 1341-1347 may be linear or non-linear, and may be continuous (e.g., as shown in FIG. 13) or comprise discrete steps. The minimum inactive state periods for the profiles 1341-1347 may be dependent upon the present maximum adjustment amount $\Delta_{INACTIVE-MAX}$, which may in turn be dependent upon the length of the respective active state period $T_{ACTIVE}$. The maximum adjustment amount $\Delta_{INACTIVE-MAX}$ of the inactive state period $T_{INACTIVE}$ may be sized to reduce perceptible changes in the relative light level of the lighting load. In an example, the profiles 1341-1347 may be configured such that when the lengths of the active state period $T_{ACTIVE}$ and the inactive state period $T_{INACTIVE}$ are both adjusted (e.g., between waveforms 1260 and 1270 as shown in FIG. 12), the waveform characterized by the greater target intensity may generate a greater light output of the lighting load. In such an example, there may be slight steps up in the actual light output of the lighting load when the lengths of the active state period $T_{ACTIVE}$ and the inactive state period $T_{INACTIVE}$ are both adjusted (e.g., between waveforms 1260 and 1270 as shown in FIG. 12).

The graphs 1300, 1310 may represent a portion of the target intensity range between the low-end intensity $L_{LE}$ and the transition intensity $L_{TRAN}$ or the entire target intensity range between the low-end intensity $L_{LE}$ and the transition intensity $L_{TRAN}$. More or less than seven active state periods $T_{ACTIVE}$ (e.g., $T_{ACTIVE-MIN}$ through 1337) may be provided between the low-end intensity $L_{LE}$ and the transition intensity $L_{TRAN}$.

Figure 14:
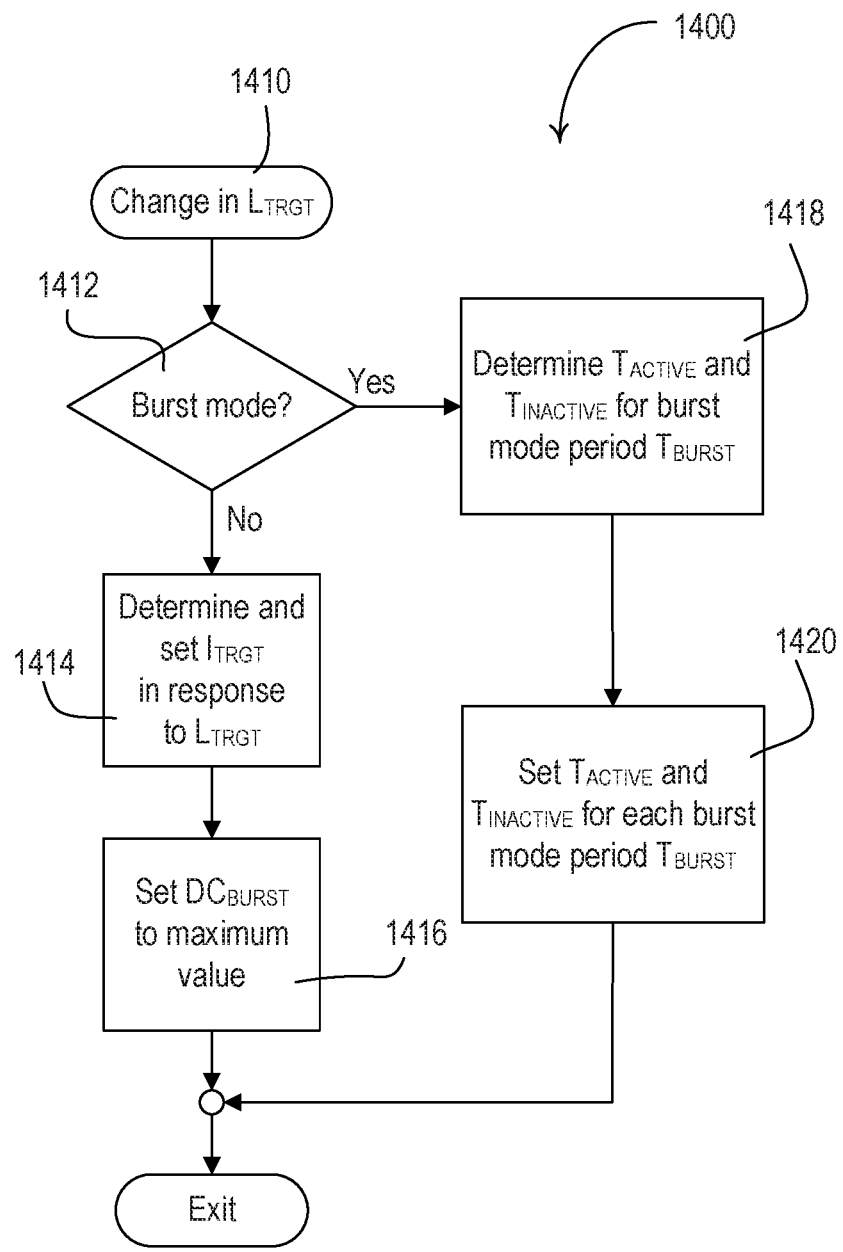
FIG. 14 is a simplified flowchart of an example procedure for operating a forward converter of an LED driver in a normal mode and a burst mode.

FIG. 14 illustrates an example target intensity procedure 1400 that may be executed by the control circuit described herein (e.g., the control circuit 150 of the LED driver 100 shown in FIG. 1 and/or the control circuit 150 controlling the forward converter 240 and the current sense circuit 260 shown in FIG. 5). For example, the target intensity procedure 1400 may be executed when the target intensity $L_{TRGT}$ is adjusted at 1410 (e.g., in response to digital messages received via the communication circuit 180). The control circuit may determine if it is operating the load regulation circuit in the burst mode at 1412 (e.g., the target intensity $L_{TRGT}$ is between the low-end intensity $L_{LE}$ and the transition intensity $L_{TRAN}$, or $L_{LE} \leq L_{TRGT} \leq L_{TRAN}$). If the control circuit determines that it is not operating the load regulation circuit in the burst mode (e.g., but rather in the normal mode), then the control circuit may determine and set the target load current $I_{TRGT}$ as a function of the target intensity $L_{TRGT}$ at 1414 (e.g., as shown in FIG. 2). The control circuit may then set the burst duty cycle $DC_{BURST}$ equal to a maximum duty cycle $DC_{MAX}$ (e.g., approximately 100%) at 1415 (e.g., as shown in FIG. 3), and the control circuit may exit the target intensity procedure 1400.

If the control circuit determines that it is operating the load regulation circuit in the burst mode at 1412 (e.g., the target intensity $L_{TRGT}$ is below the transition intensity $L_{TRAN}$, or $L_{TRGT} < L_{TRAN}$), then the control circuit may determine the lengths of the active state period $T_{ACTIVE}$ and/or the inactive state period $T_{INACTIVE}$ for one or more burst mode periods $T_{BURST}$ (e.g., using open loop control) at 1418. For example, the control circuit may determine target lengths of the active state period $T_{ACTIVE}$ and the inactive state period $T_{INACTIVE}$ that correspond to the target intensity $L_{TRGT}$. The control circuit may then determine the lengths of the active state period $T_{ACTIVE}$ and/or the inactive state period $T_{INACTIVE}$ for one or more burst mode periods. As described herein, the length of the inactive state period may be gradually adjusted (e.g., gradually increased or decreased) in one or more burst mode periods until a maximum amount of adjustment is reached. The length of the active state period may then be adjusted in a subsequent burst mode period. The determination process may be repeated in the manner described herein until the target lengths of the active state period $T_{ACTIVE}$ and inactive state period $T_{INACTIVE}$ are achieved.

The control circuit may perform the foregoing process by calculating the relevant values in real-time or retrieving the values from memory (e.g., via a lookup table or the like). The control circuit may set the lengths of the active state period $T_{ACTIVE}$ and/or the inactive state period $T_{INACTIVE}$ for the one or more burst mode periods $T_{BURST}$ at 1420, and the control circuit may exit the target intensity procedure 1400. As described herein, the control circuit may adjust the active state period $T_{ACTIVE}$ and/or the inactive state period $T_{INACTIVE}$ as a function of the target intensity $L_{TRGT}$ using open loop control. Other ways to adjust the active state period $T_{ACTIVE}$ and/or the inactive state period $T_{INACTIVE}$ may be employed, including, for example, using closed loop control (e.g., in response to the load current feedback signal $V_{I-LOAD}$).

One or more of the embodiments described herein (e.g., as performed by a load control device) may be used to decrease the intensity of a lighting load and/or increase the intensity of the lighting load. For example, one or more embodiments described herein may be used to adjust the intensity of the lighting load from on to off, off to on, from a higher intensity to a lower intensity, and/or from a lower intensity to a higher intensity. For example, one or more of the embodiments described herein (e.g., as performed by a load control device) may be used to fade the intensity of a light source from on to off (e.g., the low-end intensity $L_{LE}$ may be equal to 0%) and/or to fade the intensity of the light source from off to on.

Although described with reference to an LED driver, one or more embodiments described herein may be used with other load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

The invention claimed is:

1. A load control device for controlling an amount of power delivered to an electrical load, the load control device comprising:
   a load regulation circuit configured to control a magnitude of a load current conducted through the electrical load to control the amount of power delivered to the electrical load;
   a current sense circuit configured to provide a feedback signal that indicates the magnitude of the load current; and
   a control circuit configured to adjust the amount of power delivered to the electrical load in response to the feedback signal by controlling the load regulation circuit to operate in an active state by conducting the load current through the electrical load during an active time period and to operate in an inactive state by not conducting the load current through the electrical load during an inactive time period, the control circuit configured to operate in the active state and the inactive state on a periodic basis over a plurality of operating periods, each of the operating periods including the active time period and the inactive time period;
   wherein the control circuit is further configured to adjust the amount of power delivered to the electrical load by:
   while holding the length of the active time period constant, adjusting the length of the inactive time period by an inactive state adjustment amount in one or more of a plurality of consecutive operating periods from a first inactive time period length in a first operating period to a second inactive time period length in a second operating period; and
   during a third subsequent operating period, adjusting the length of the active time period by an active state adjustment amount that is longer than the inactive state adjustment amount and adjusting the length of the inactive time period to the first inactive time period length.

2. The load control device of claim 1, wherein the control circuit is configured to generate at least one drive signal for controlling the load regulation circuit to adjust the average magnitude of the load current.

3. The load control device of claim 2, wherein the control circuit is configured to operate in the active state during the active time period to adjust an operational characteristic of the at least one drive signal in response to the feedback signal in order to regulate a peak magnitude of the load current to a target current, the control circuit further configured to operate in the inactive state during the inactive time period to stop generating the at least one drive signal in response to the feedback signal.

4. The load control device of claim 3, wherein the control circuit is configured to:
   when the target current is less than a transition current, the control circuit is configured to adjust the average magnitude of the load current by adjusting the lengths of the active time period and the inactive time period; and
   when the target current is greater than the transition current, regulate the average magnitude of the load current by holding the length of the active time period and the length of the inactive time period constant, and adjusting the target current.

5. The load control device of claim 4, wherein the transition current is a minimum rated current of the load regulation circuit.

6. The load control device of claim 4, wherein, when the target current is greater than the transition current, the control circuit is configured to maintain the length of the inactive time period at approximately zero.

7. The load control device of claim 4, wherein the control circuit is configured to operate in a normal mode when the target current is greater than the transition current and to operate in a burst mode when the target current is less than the transition current.

8. The load control device of claim 2, wherein the load regulation circuit comprises at least one switching device that is driven by the at least one drive signal.

9. The load control device of claim 8, wherein the active adjustment amount is equal to a length of one cycle of the load regulation circuit.

10. The load control device of claim 2, wherein the operational characteristic of the at least one drive signal includes a duty cycle of the at least one drive signal.

11. The load control device of claim 2, wherein the operational characteristic of the at least one drive signal comprises a frequency of the at least one drive signal.

12. The load control device of claim 1, wherein the control is further configured to adjusting the amount of power delivered to the electrical load by:
   while holding the length of the active time period constant, adjusting the length of the inactive time period by the inactive state adjustment amount in one or more of a plurality of consecutive operating periods from the first inactive time period length in the third operating period to the second inactive time period length in a fourth operating period.

13. The load control device of claim 12, wherein the control is further configured to adjusting the amount of power delivered to the electrical load by:
   during a fifth subsequent operating period, adjusting the length of the active time period by the active state adjustment amount and adjusting the length of the inactive time period to the first inactive time period length.

14. The load control device of claim 1, wherein the control circuit is configured to adjust the length of the inactive time period by the inactive state adjustment amount from the first inactive time period length until a total amount of adjustment is approximately equal to a threshold value.

15. The load control device of claim 14, wherein the threshold value is determined as a function of the length of the active time period in one of the plurality of operating periods.

16. The load control device of claim 1, wherein the load regulation circuit comprises a light-emitting diode (LED) driver circuit for controlling an intensity of an LED light source.

17. The load control device of claim 1, wherein the load regulation circuit comprises at least one of: a forward converter, a buck converter, or a linear regulator.

18. A method of controlling an amount of power delivered to an electrical load, the method comprising:
- adjusting the amount of power delivered to the electrical load by controlling a load regulation circuit to operate in an active state by conducting a load current through the electrical load during an active time period and to operate in an inactive state by not conducting the load current through the electrical load during an inactive time period, wherein the active state and the inactive state repeat on a periodic basis over a plurality of operating periods and each of the operating periods includes the active time period and the inactive time period;
- while holding the length of the active time period constant, adjusting the length of the inactive time period by an inactive state adjustment amount over a plurality of consecutive operating periods from a first inactive time period length in a first operating period to a second inactive time period length in a second operating period; and
- during a third operating period after the second operating period, adjusting the length of the active time period by an active state adjustment amount that is longer than the inactive state period adjustment amount and adjusting the length of the inactive time period to the first inactive time period length.

19. The method of claim 18, further comprising:
- while holding the length of the active time period constant, adjusting the length of the inactive time period by the inactive state adjustment amount over a plurality of consecutive operating periods from the first inactive time period length in the third operating period to the second inactive time period length in a fourth operating period.

20. The method of claim 19, further comprising:
- during a fifth operating period after the fourth operating period, adjusting the length of the active time period by the active state adjustment amount and adjusting the length of the inactive time period to the first inactive time period length.

21. The method of claim 18, further comprising:
- receiving a feedback signal that indicates a magnitude of the load current;
- generating at least one drive signal for controlling the load regulation circuit to adjust the average magnitude of the load current;
- operating in the active state during the active time period to adjust an operational characteristic of the at least one drive signal in response to the feedback signal in order to regulate a peak magnitude of the load current to a target current;
- operating in the inactive state during the inactive time period to stop generating the at least one drive signal in response to the feedback signal.

22. The method of claim 21, further comprising:
- when the target current is less than a transition current, adjusting the average magnitude of the load current by adjusting the lengths of the active time period and the inactive time period; and
- when the target current is greater than the transition current, regulating the average magnitude of the load current by holding the length of the active time period and the length of the inactive time period constant, and adjusting the target current.

* * * * *